US012592840B2

(12) United States Patent
Liu et al.

(10) Patent No.: US 12,592,840 B2
(45) Date of Patent: Mar. 31, 2026

(54) BLOCKCHAIN-BASED DATA PROCESSING METHOD, DEVICE, AND READABLE STORAGE MEDIUM

(71) Applicant: TENCENT TECHNOLOGY (SHENZHEN) COMPANY LIMITED, Shenzhen (CN)

(72) Inventors: Hanqing Liu, Shenzhen (CN); Zongyou Wang, Shenzhen (CN); Hu Lan, Shenzhen (CN); Gengliang Zhu, Shenzhen (CN); Yifang Shi, Shenzhen (CN); Qucheng Liu, Shenzhen (CN); Zhiyong Liao, Shenzhen (CN); Jinsong Zhang, Shenzhen (CN); Yingjie Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 261 days.

(21) Appl. No.: 18/421,177

(22) Filed: Jan. 24, 2024

(65) Prior Publication Data

US 2024/0163118 A1     May 16, 2024

Related U.S. Application Data

(63) Continuation of application No. PCT/CN2023/101359, filed on Jun. 20, 2023.

(30) Foreign Application Priority Data

Jul. 5, 2022   (CN) .......................... 202210783272.8

(51) Int. Cl.
*H04L 9/32* (2006.01)
*H04L 9/00* (2022.01)

(52) U.S. Cl.
CPC .......... *H04L 9/3297* (2013.01); *H04L 9/3247* (2013.01); *H04L 9/50* (2022.05)

(58) Field of Classification Search
CPC ........ H04L 9/3247; H04L 9/3297; H04L 9/50
See application file for complete search history.

(56) References Cited

U.S. PATENT DOCUMENTS

2020/0334677 A1   10/2020   Hari et al.
2021/0342894 A1*  11/2021   Pestana .............. G06Q 30/0277
(Continued)

FOREIGN PATENT DOCUMENTS

CN   110490282 A   11/2019
CN   114297304 A    4/2022
(Continued)

OTHER PUBLICATIONS

The World Intellectual Property Organization (WIPO) International Search Report for PCT/CN2023/101359 Oct. 17, 2023 5 Pages (including translation).

*Primary Examiner* — Kostas J Katsikis
(74) *Attorney, Agent, or Firm* — Anova Law Group, PLLC

(57) ABSTRACT

A blockchain-based data processing method, performed by a side chain node, includes obtaining a transaction on-chain request carrying a business transaction transmitted by a business device, determining a transaction execution result corresponding to the business transaction based on the transaction on-chain request, and performing on-chain processing on the transaction execution result and the business transaction; generating business transaction digest information corresponding to the business transaction based on a transaction sequence number, a business type identifier, and the transaction execution result in response to the transaction execution result and the business transaction being successfully stored in a side blockchain; and transmitting the (Continued)

Obtain a transaction on-chain request carrying a business transaction transmitted by a business device, determine a transaction execution result corresponding to the business transaction based on the transaction on-chain request, and perform on-chain processing on the transaction execution result and the business transaction — S101

Generate business transaction digest information corresponding to the business transaction based on a transaction sequence number, a business type identifier, and the transaction execution result in response to the transaction execution result and the business transaction being successfully stored in a side blockchain — S102

Transmit the business transaction digest information to a main blockchain to store the business transaction digest information — S103 business transaction digest information to a main blockchain
to store the business transaction digest information.

20 Claims, 13 Drawing Sheets

(56)                    References Cited

U.S. PATENT DOCUMENTS

| | | | |
|---|---|---|---|
| 2024/0004866 A1* | 1/2024 | Zhang .................. | G06F 16/278 |
| 2025/0028970 A1* | 1/2025 | Ma ......................... | G06F 16/27 |
| 2025/0343768 A1* | 11/2025 | Mclaughlin .......... | H04L 47/822 |

FOREIGN PATENT DOCUMENTS

| | | | | |
|---|---|---|---|---|
| CN | 114374502 A | 4/2022 | | |
| WO | WO-2020142000 A1 * | 7/2020 | .............. | H04L 9/50 |

* cited by examiner

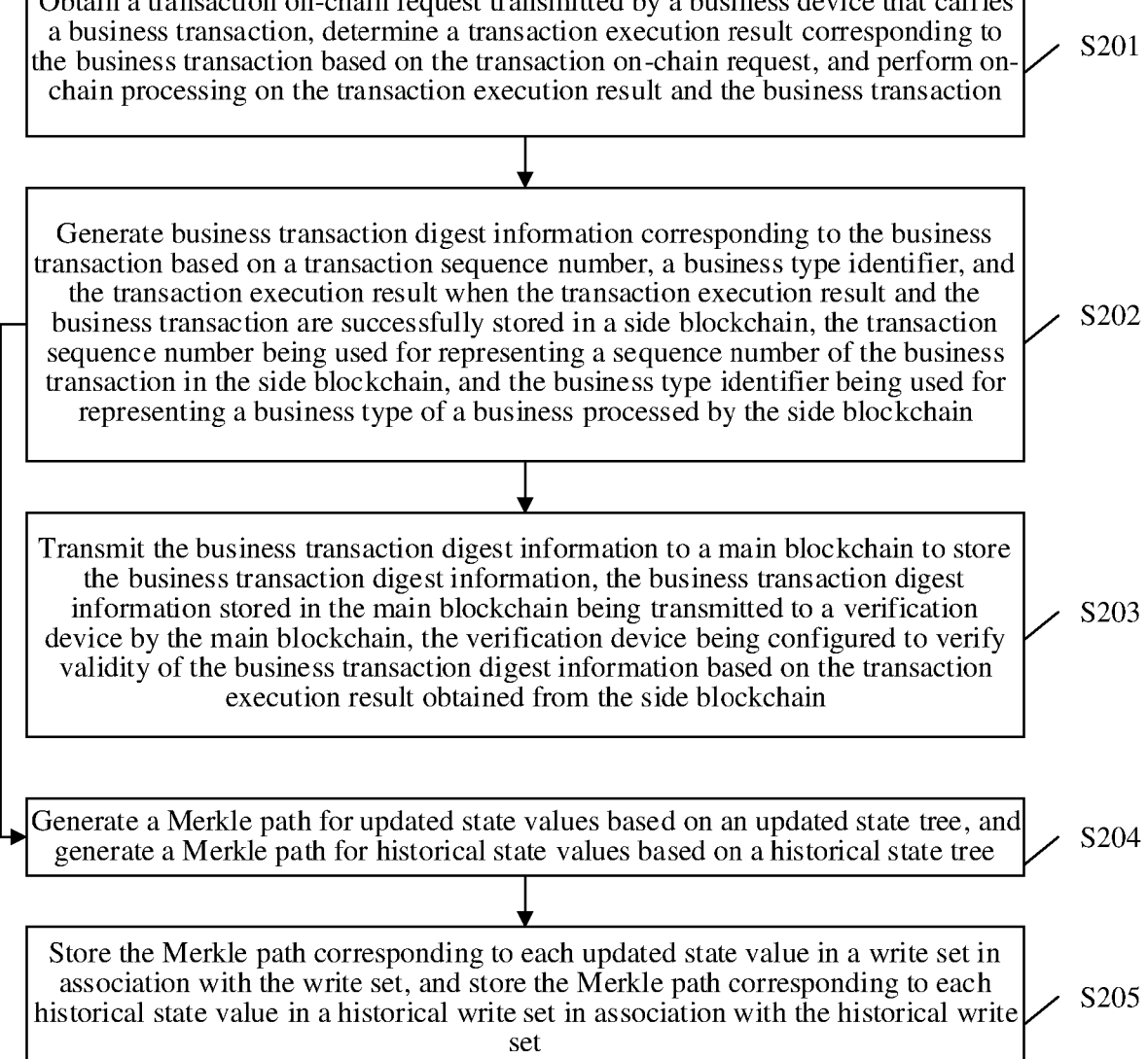

Obtain a transaction on-chain request transmitted by a business device that carries a business transaction, determine a transaction execution result corresponding to the business transaction based on the transaction on-chain request, and perform on-chain processing on the transaction execution result and the business transaction          S201

Generate business transaction digest information corresponding to the business transaction based on a transaction sequence number, a business type identifier, and the transaction execution result when the transaction execution result and the business transaction are successfully stored in a side blockchain, the transaction sequence number being used for representing a sequence number of the business transaction in the side blockchain, and the business type identifier being used for representing a business type of a business processed by the side blockchain          S202

Transmit the business transaction digest information to a main blockchain to store the business transaction digest information, the business transaction digest information stored in the main blockchain being transmitted to a verification device by the main blockchain, the verification device being configured to verify validity of the business transaction digest information based on the transaction execution result obtained from the side blockchain          S203

Generate a Merkle path for updated state values based on an updated state tree, and generate a Merkle path for historical state values based on a historical state tree          S204

Store the Merkle path corresponding to each updated state value in a write set in association with the write set, and store the Merkle path corresponding to each historical state value in a historical write set in association with the historical write set          S205

FIG. 7

Figure 9:
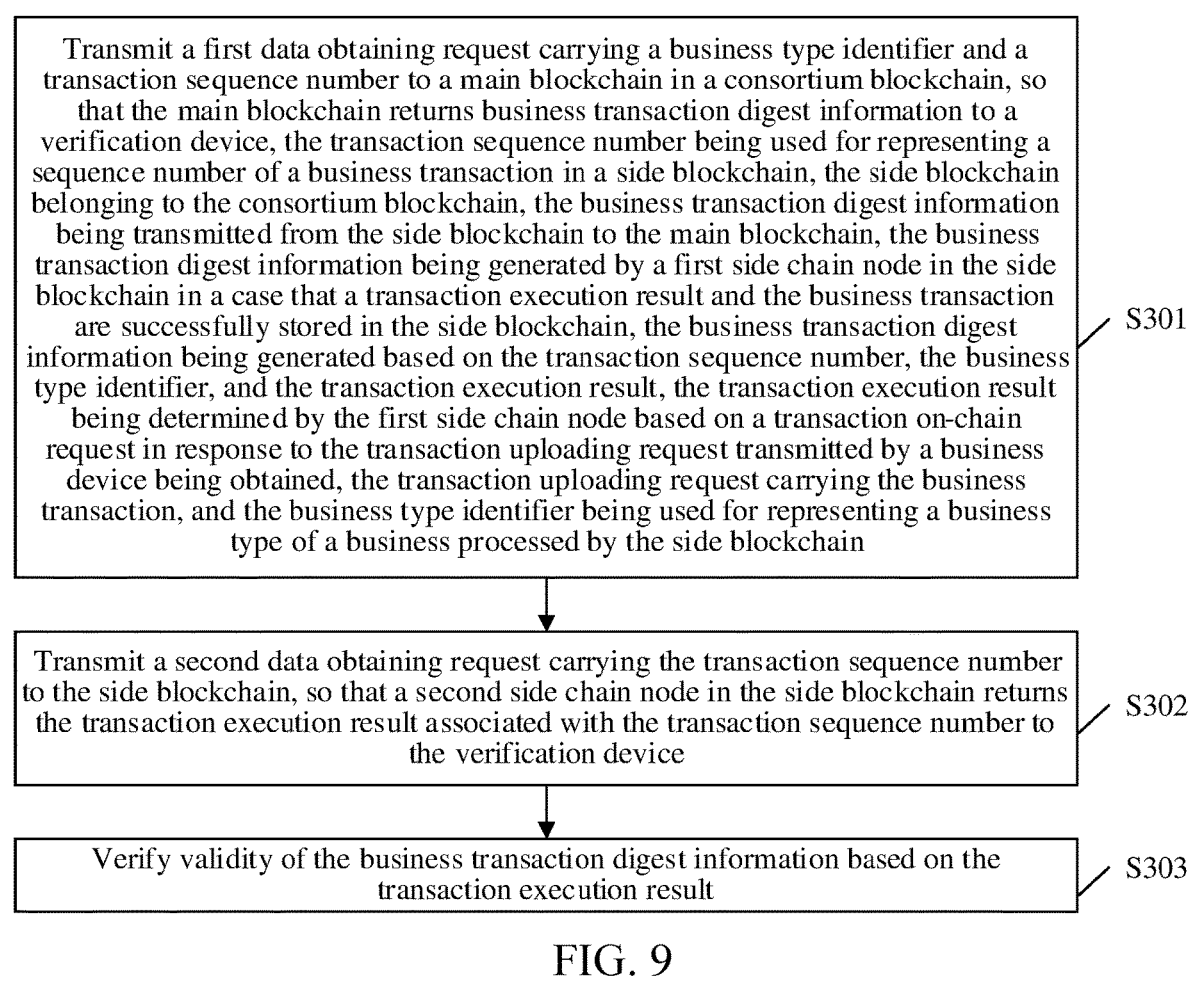

Transmit a first data obtaining request carrying a business type identifier and a transaction sequence number to a main blockchain in a consortium blockchain, so that the main blockchain returns business transaction digest information to a verification device, the transaction sequence number being used for representing a sequence number of a business transaction in a side blockchain, the side blockchain belonging to the consortium blockchain, the business transaction digest information being transmitted from the side blockchain to the main blockchain, the business transaction digest information being generated by a first side chain node in the side blockchain in a case that a transaction execution result and the business transaction are successfully stored in the side blockchain, the business transaction digest information being generated based on the transaction sequence number, the business type identifier, and the transaction execution result, the transaction execution result being determined by the first side chain node based on a transaction on-chain request in response to the transaction uploading request transmitted by a business device being obtained, the transaction uploading request carrying the business transaction, and the business type identifier being used for representing a business type of a business processed by the side blockchain

S301

Transmit a second data obtaining request carrying the transaction sequence number to the side blockchain, so that a second side chain node in the side blockchain returns the transaction execution result associated with the transaction sequence number to the verification device

S302

Verify validity of the business transaction digest information based on the transaction execution result

BLOCKCHAIN-BASED DATA PROCESSING METHOD, DEVICE, AND READABLE STORAGE MEDIUM

CROSS-REFERENCES TO RELATED APPLICATIONS

This application is a continuation application of PCT Patent Application No. PCT/CN2023/101359, filed on Jun. 20, 2023, which claims priority to Chinese Patent Application No. 202210783272.8, filed on Jul. 5, 2022, the content of all of which is incorporated herein by reference in their entirety.

FIELD OF THE TECHNOLOGY

The present disclosure relates to the field of Internet technologies and, in particular, to a blockchain-based data processing method and apparatus, a computer device, a readable storage medium, and a program product.

BACKGROUND OF THE DISCLOSURE

With the rapid development of network technology and increasing emphasis on data security, blockchains have gained attentions and applications.

For a trusted blockchain, blockchain resources are usually limited. The blockchain resources may include computing resources and storage resources of the blockchain. However, the computing resources and storage resources of the blockchain are often limited. Therefore, with a continuous increase in a quantity of blocks, blockchains may face challenges of insufficient blockchain resources.

SUMMARY

One aspect of the present disclosure provides a blockchain-based data processing method, performed by a side chain node, the side chain node belonging to a side blockchain in a consortium blockchain and the consortium blockchain further comprising a main blockchain. The method includes obtaining a transaction on-chain request carrying a business transaction transmitted by a business device, determining a transaction execution result corresponding to the business transaction based on the transaction on-chain request, and performing on-chain processing on the transaction execution result and the business transaction; generating business transaction digest information corresponding to the business transaction based on a transaction sequence number, a business type identifier, and the transaction execution result in response to the transaction execution result and the business transaction being successfully stored in the side blockchain, the transaction sequence number being used for representing a sequence number of the business transaction in the side blockchain, and the business type identifier being used for representing a business type of a business processed by the side blockchain; and transmitting the business transaction digest information to the main blockchain to store the business transaction digest information.

Another aspect of the present disclosure provides a computer device. The computer device includes a memory and one or more processors. The memory stores computer-readable instructions that, when being executed, cause the one or more processors to perform: obtaining a transaction on-chain request carrying a business transaction transmitted by a business device, determining a transaction execution result corresponding to the business transaction based on the transaction on-chain request, and performing on-chain processing on the transaction execution result and the business transaction; generating business transaction digest information corresponding to the business transaction based on a transaction sequence number, a business type identifier, and the transaction execution result in response to the transaction execution result and the business transaction being successfully stored in the side blockchain, the transaction sequence number being used for representing a sequence number of the business transaction in the side blockchain, and the business type identifier being used for representing a business type of a business processed by the side blockchain; and transmitting the business transaction digest information to the main blockchain to store the business transaction digest information.

Another aspect of the present disclosure provides a non-transitory computer readable storage medium containing computer-readable instructions that, when being executed, cause one or more processors to perform: obtaining a transaction on-chain request carrying a business transaction transmitted by a business device, determining a transaction execution result corresponding to the business transaction based on the transaction on-chain request, and performing on-chain processing on the transaction execution result and the business transaction; generating business transaction digest information corresponding to the business transaction based on a transaction sequence number, a business type identifier, and the transaction execution result in response to the transaction execution result and the business transaction being successfully stored in the side blockchain, the transaction sequence number being used for representing a sequence number of the business transaction in the side blockchain, and the business type identifier being used for representing a business type of a business processed by the side blockchain; and transmitting the business transaction digest information to the main blockchain to store the business transaction digest information.

Details of one or more embodiments of the present disclosure are provided in the following accompanying drawings and descriptions. Other features, objectives, and advantages of the present disclosure become apparent from the specification, the accompanying drawings, and the claims.

BRIEF DESCRIPTION OF THE DRAWINGS

In order to describe the technical solutions in embodiments of the present disclosure or in the related art more clearly, the accompanying drawings required for describing the embodiments or the related art are to be briefly described below. Apparently, the accompanying drawings in the following description show only some embodiments of the present disclosure.

FIG. 7 is a schematic flowchart of another blockchain-based data processing method according to an embodiment of the present disclosure.

FIG. 9 is a schematic flowchart of another blockchain-based data processing method according to an embodiment of the present disclosure.

DESCRIPTION OF EMBODIMENTS

Figure 1:
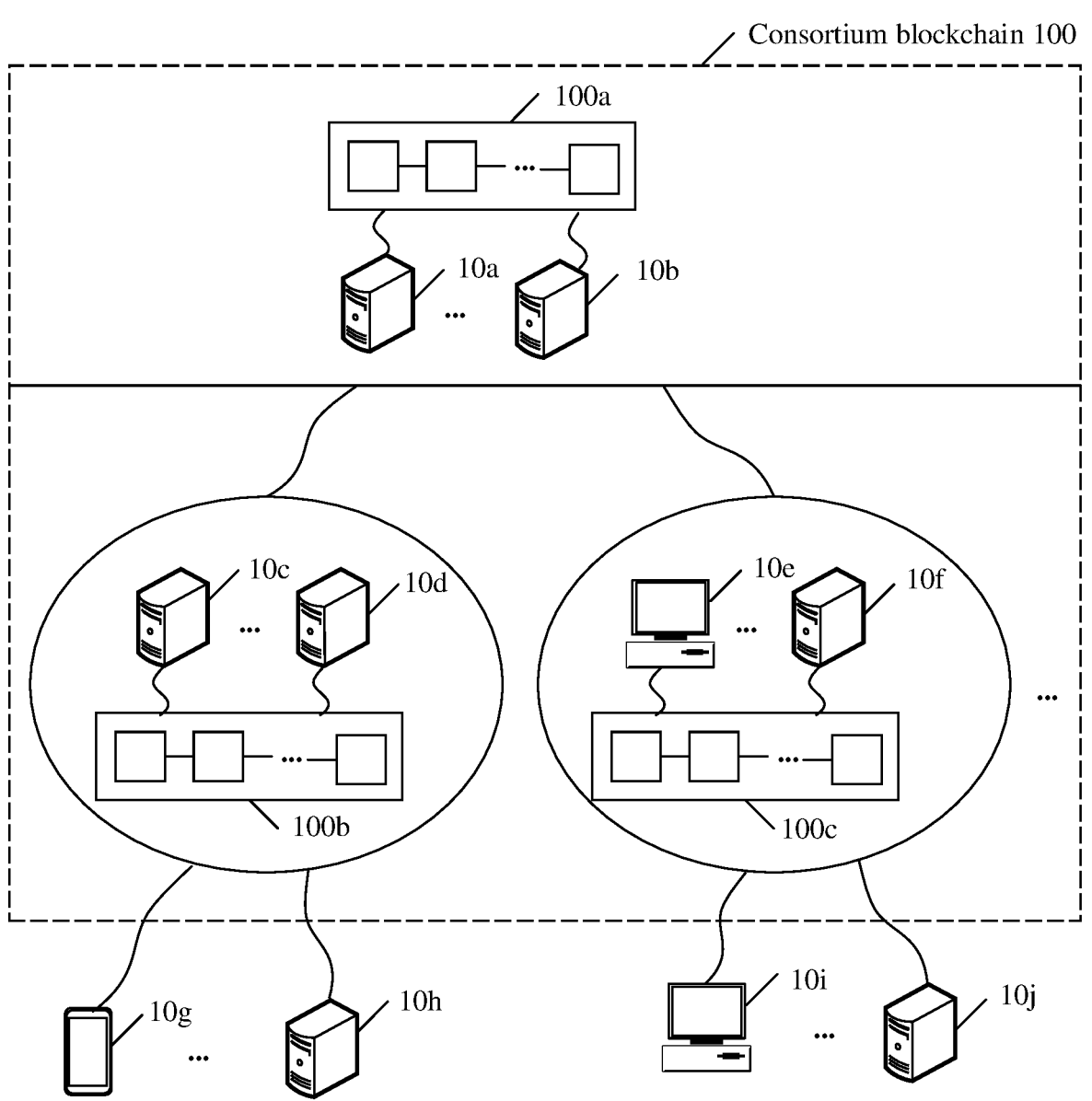
FIG. 1 is a schematic diagram of a system architecture according to an embodiment of the present disclosure.

The technical solutions in embodiments of the present disclosure are described clearly and completely below with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts fall within the protection scope of the present disclosure.

For ease of understanding, some terms are briefly described below.

1. Blockchain: In a narrow sense, the blockchain is a linked data structure using a block as a basic unit, and in the block, a previously obtained transaction history is verified by using a digital digest, which is suitable for requirements of tamper resistance and scalability in a distributed ledger scenario. In a broad sense, the blockchain further refers to a distributed ledger technology implemented by a blockchain structure, including a distributed consensus, privacy and security protection, a peer-to-peer communication technology, a network protocol, a smart contract, and the like. A goal of the blockchain is to implement a distributed data record ledger. The ledger can only be added, not deleted. An underlying structure of the ledger is a linear linked list. The linked list is composed of "blocks" connected in series, and a hash value of a previous block is recorded in a next block. Whether each block (and a transaction the block) is legal may be quickly verified by calculating the hash value. If a node in a network proposes to add a new block, a consensus needs to be reached on the block through a consensus mechanism for confirmation.

For a credible (e.g., trusted) blockchain, a computing resource and a storage space thereof are limited. Therefore, with a continuous increase in a quantity of blocks, an insufficient available storage space corresponding to the credible blockchain and slower response than a request may be caused. In this case, expansion is necessary. If an expanded blockchain is obtained through expansion, in order to ensure efficiency of the expansion, a private chain is usually used as the expanded blockchain. In the present disclosure, the credible blockchain is referred to as a main blockchain, and the expanded blockchain is referred to as a side blockchain. That is to say, the side blockchain functions to expand the main blockchain. The main blockchain and the side blockchain may form a consortium blockchain.

2. Block: It is a data packet carrying transaction data on a blockchain network, which is a data structure marked with a timestamp and a corresponding hash value of a previous block. The block is verified through a consensus mechanism of the network, and a transaction in the block is confirmed. The block includes a block header and a block body. The block header may record metadata of a current block, including data such as a current version number, a hash value corresponding to the previous block, a timestamp, a random number, and a hash value of a Merkle root. The block body may record detailed data generated over a period of time, including all transaction records or other information that is verified in the current block and generated during creation of the block, which may be understood as a representation form of a ledger. In addition, the detailed data of the block body may include a unique Merkle root generated through a hashing process of a Merkle tree that is recorded in the block header.

The previous block is also referred to as a parent block. The blockchain achieves time sorting by recording a hash value corresponding to the block and a hash value corresponding to the parent block in the block header.

3. Hash value (hash): It is also referred to as an information eigenvalue or an eigenvalue. The hash value is generated by transforming input data of an arbitrary length into a cipertext of a fixed length through a hash algorithm and outputting the cipertext. The original input data cannot be retrieved by decrypting the hash value, which is a one-way cryptographic function. In the blockchain, each block (except an initial block) includes a hash value of the previous block. The hash value is a potential core foundation and the most important aspect of blockchain technologies, which preserves authenticity of recording and viewing data and integrity of the blockchain as a whole.

4. Blockchain node: The blockchain network divides nodes into a consensus node (also referred to as a core node) and a synchronization node (which may include a data node and a light node). The consensus node is responsible for a consensus business of the whole blockchain network. The synchronization node is responsible for synchronizing ledger information of the consensus node, that is, synchronizing the latest block data. An internal structure of the consensus node or the synchronization node includes a network communication component, and needs to communicate with another node in the blockchain network through a P2P component since the blockchain network is essentially a peer-to-peer (P2P) network. Resources and services in the blockchain network are scattered on each node, and transmission of information and implementation of services are both directly performed between the nodes, without the intervention of an intermediate link or a centralized server (a third party).

In one embodiment of the present disclosure, the blockchain node included in the main blockchain is referred to as a main chain node, and the blockchain node included in the side blockchain is referred to as a side chain node. The side chain node may further be divided into a side chain synchronization node (having the same function as the foregoing synchronization node) and a side chain consensus node (having the same function as the foregoing consensus node).

5. Write set: After execution of a transaction, the consensus node calculates a write set and fills the write set in a structure of the transaction. The write set does not partici-pate in calculation of transaction hashes. A write set of a transaction records all on-disk operations of the transaction. A link state may be quickly updated through the write set without executing the transaction. This embodiment of the present disclosure provides a historical write set. The his-torical write set is an initial state of an on-disk object before execution of the transaction.

6. Read set: Similar to the write set, the read set records all disk reading operations during the execution of the transaction.

7. Merkle tree and Merkle root: The Merkle tree is a typical binary tree structure and is composed of a root node (a Merkle root), a set of intermediate nodes, and a set of leaf nodes. The lowest leaf node stores data or a hash value thereof, and another node stores hash values of contents of two child nodes of the another node.

8. Asymmetric signature: The algorithm includes two keys: a public key and a private key. The public key and the private key are a pair. If data is signed by using the private key, only the corresponding public key can be used for signature verification. Since two different keys are respec-tively used in the signature process and the signature veri-fication process, the algorithm is referred to as the asym-metric signature. A basic process of realizing exchange of confidential information by the asymmetric signature may be as follows. Party A generates a pair of keys and discloses the public key. When necessary to transmit information to another role (Party B), Party A uses the private key thereof to sign the confidential information and then transmits the signed confidential information to Party B, and then Party B uses the public key of Party A to verify the signed informa-tion.

9. Smart Contract: It is a computer protocol intended to disseminate, verify, or execute a contract in an information-based manner. In a blockchain system, the smart contract (a contract for short) is code that each node in the blockchain may understand and execute, and may execute any logic and obtain a result. In practical application, the smart contract is managed and tried through a transaction on the blockchain. Each transaction is equivalent to a remote procedure call (RPC) request for the blockchain system. If the smart contract is equivalent to an executable program, the block-chain is equivalent to an operating system that provides a running environment. The blockchain may include a plural-ity of contracts (such as a resource fusion function and a resource issuance function in the present disclosure), which are distinguished by using a contract identity (ID), an identification number, or a name.

FIG. 1 is a schematic diagram of a system architecture according to an embodiment of the present disclosure. As shown in FIG. 1, the system architecture may include a terminal device cluster and a blockchain node cluster in a consortium blockchain 100. The terminal device cluster may include a terminal device 10g, a terminal device 10h, a terminal device 10i, and a terminal device 10j. The block-chain node cluster may include a blockchain node 10a, a blockchain node 10b, a blockchain node 10c, a blockchain node 10d, a blockchain node 10e, and a blockchain node 10f. A quantity of the terminal device clusters is not limited in one embodiment of the present disclosure, and one or more terminal devices may be included. Similarly, attributes of the blockchain node clusters are not limited, and one or more blockchain nodes may be included.

A communication connection may exist between the terminal device clusters. For example, a communication connection exists between the terminal device 10i and the terminal device 10g. A communication connection may exist between the blockchain nodes. For example, a communica-tion connection exists between the blockchain node 10a and the blockchain node 10c, and the communication connection exists between the blockchain node 10a and the blockchain node 10d. The communication connection may exist between any blockchain node in the blockchain node cluster and any terminal device in the terminal device cluster. For example, the communication connection exists between the blockchain node 10a and the terminal device 10h, the communication connection exists between the blockchain node 10d and the terminal device 10j, the communication connection exists between the blockchain node 10c and the terminal device 10g, and the communication connection exists between the blockchain node 10e and the terminal device 10i. The foregoing communication connection is not limited to a connection manner, which may be direct or indirect connection through wired communication, or may be direct or indirect connection through wireless communi-cation or another manner.

Data or blocks may be transmitted between the block-chain nodes through the foregoing communication connec-tion. The communication connection between the foregoing blockchain nodes may be based on a node identifier. Each blockchain node in the blockchain network has a node identifier corresponding to the blockchain node, and each blockchain node may store a node identifier of another blockchain node connected to the blockchain node, so that obtained data or generated blocks may be disseminated to the another blockchain node based on the node identifier of the another blockchain node subsequently. For example, the blockchain node 10a may maintain a node identifier list, the node identifier list storing node names and node identifiers of other blockchain nodes, as shown in Table 1.

TABLE 1

| Node name | Node identifier |
|---|---|
| Blockchain node 10b | AAAAA |
| Blockchain node 10c | BBBBB |
| . . . | . . . |
| Blockchain node 10d | CCCCC |
| Blockchain node 10e | DDDDD |
| Blockchain node 10f | EEEEE |
| . . . | . . . |

The node identifier may be an Internet protocol (IP) address and any other piece of information that can be used for identifying the blockchain node in the blockchain net-work.

Assuming that a node identifier of the blockchain node 10a is FFFFFF, the blockchain node 10a may transmit a digest-information uploading request to the blockchain node 10d through a node identifier CCCCC, and the blockchain node 10d may learn, through a node identifier FFFFFF, that the digest-information uploading request is transmitted by the blockchain node 10a. Similarly, the blockchain node 10d may transmit a block consensus request to the blockchain node 10c through a node identifier BBBBBB, the blockchain node 10c may learn, through the node identifier CCCCCC, that the block consensus request is transmitted by the blockchain node 10d, and the same is true for data trans-mission between other nodes.

In one embodiment of the present disclosure, the block-chain network is divided into a main blockchain network and one or more side blockchain networks, which form the consortium blockchain 100. A quantity of blockchains in the consortium blockchain 100 is not limited in one embodiment of the present disclosure. Referring to FIG. 1 again, the consortium blockchain 100 may include a main blockchain 100*a*, a side blockchain 100*b*, . . . , and a side blockchain 100*c*. The blockchain node 10*a*, . . . , and the blockchain node 10*b* belong to nodes in the main blockchain 100*a*, that is, main chain nodes in the blockchain network cluster. The blockchain node 10*c*, . . . , and the blockchain node 10*d* belong to nodes in the side blockchain 100*b*, that is, side chain nodes in the side blockchain 100*b*. The blockchain node 10*e*, . . . , and the blockchain node 10*f* belong to nodes in the side blockchain 100*c*, that is, side chain nodes in the side blockchain 100*c*. The blockchain node (also including the blockchain node 10*a*, the blockchain node 10*b*, the blockchain node 10*c*, the blockchain node 10*d*, the block-chain node 10*e*, and the blockchain node 10*f*) may be configured to maintain the blockchain to which the block-chain node belongs. The main blockchain 100*a*, the side blockchain 100*b*, . . . , and the side blockchain 100*c* described above may all be understood as a distributed system. In the distributed system, any device such as a server or a user terminal may join and become a blockchain node.

An enterprise may include various types of business data, for example, enterprise tax data, social security data, and industry and business related data. The different types of business data are stored on different blockchains. For example, the terminal device 10*g* and the terminal device 10*h* respectively store the enterprise tax data in the side blockchain 100*b* in the consortium blockchain 100, the terminal device 10*i* and the terminal device 10*j* store the social security data in the side blockchain 100*c* in the consortium blockchain 100, and the terminal device 10*g* and the terminal device 10*i* respectively store the industry and business related data in another side blockchain in the consortium blockchain 100. In one embodiment of the present disclosure, the side chain node in the side blockchain may receive a business transaction transmitted by a client during normal operation, generate a block based on the received business transaction, and then perform block on-chain processing, that is, perform block on-chain processing in the blockchain maintained by the side chain node. A specific implementation of the present disclosure relates to relevant data such as user information (for example, a business transaction). When this embodiment of the present disclosure is applied to a specific product or technology, a user permission or consent needs to be obtained, and col-lection, use, and processing of the relevant data need to comply with relevant laws, regulations, and standards of relevant countries and regions.

It may be learned from the above that each side block-chain in one embodiment of the present disclosure indepen-dently maintains a type of full data, that is, the stored full business data is different, and the maintained blocks are also different. Similarly, the block maintained by the main block-chain 100*a* is different from the block maintained by the side blockchain (for example, the side blockchain 100*b* in FIG. 1).

The blockchain node in the consortium blockchain 100 in FIG. 1 includes but is not limited to a mobile terminal or a server. The foregoing server may be an independent physical server, or may be a server cluster formed by a plurality of physical servers or a distributed system, and may further be a cloud server providing basic cloud computing services such as cloud service, a cloud database, cloud computing, a cloud function, cloud storage, a network service, cloud communication, a middleware service, a domain name ser-vice, a security service, a content delivery network (CDN for short), big data, and an artificial intelligence platform. The foregoing mobile terminal includes but is not limited to a mobile phone, a computer, an intelligent voice interaction device, a smart home appliance, an on-board terminal, an aircraft, and the like. The mobile terminal and the server may be directly or indirectly connected in a wired or wireless manner.

Figure 2:
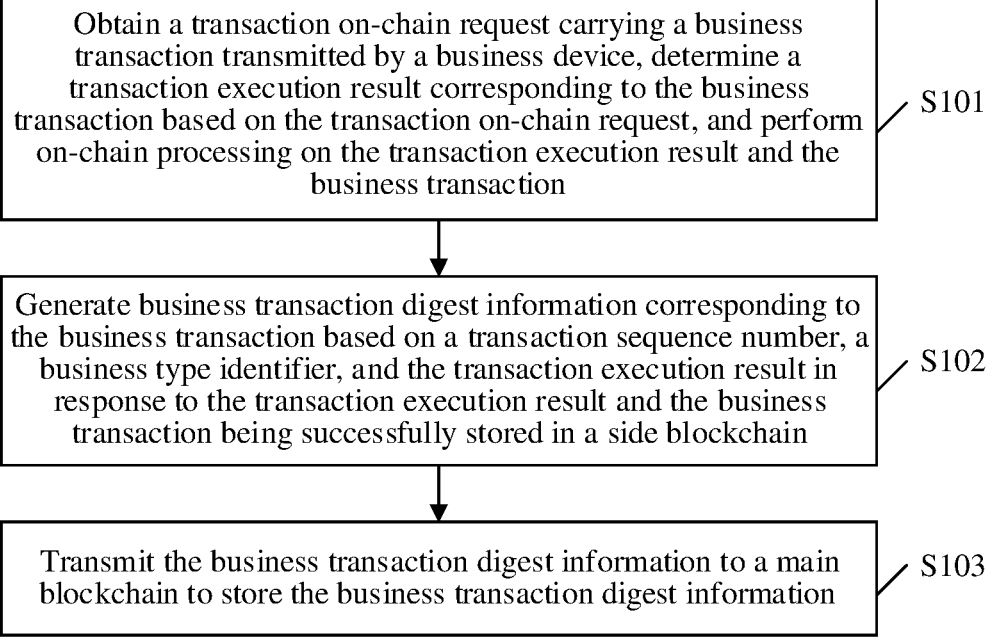
FIG. 2 is a schematic flowchart of a blockchain-based data processing method according to an embodiment of the present disclosure.

FIG. 2 is a schematic flowchart of a blockchain-based data processing method according to an embodiment of the present disclosure. The blockchain-based data processing method may be performed by a side chain node in a side blockchain Z of a consortium blockchain. The consortium blockchain may be the consortium blockchain 100 in FIG. 1. The side blockchain Z may be any side blockchain in FIG. 1. As shown in FIG. 2, the blockchain-based data processing method may include at least the following step S101 to step S103.

In S101: obtain a transaction on-chain request carrying a business transaction transmitted by a business device, deter-mine a transaction execution result corresponding to the business transaction based on the transaction on-chain request, and perform on-chain processing on the transaction execution result and the business transaction.

Figure 3:
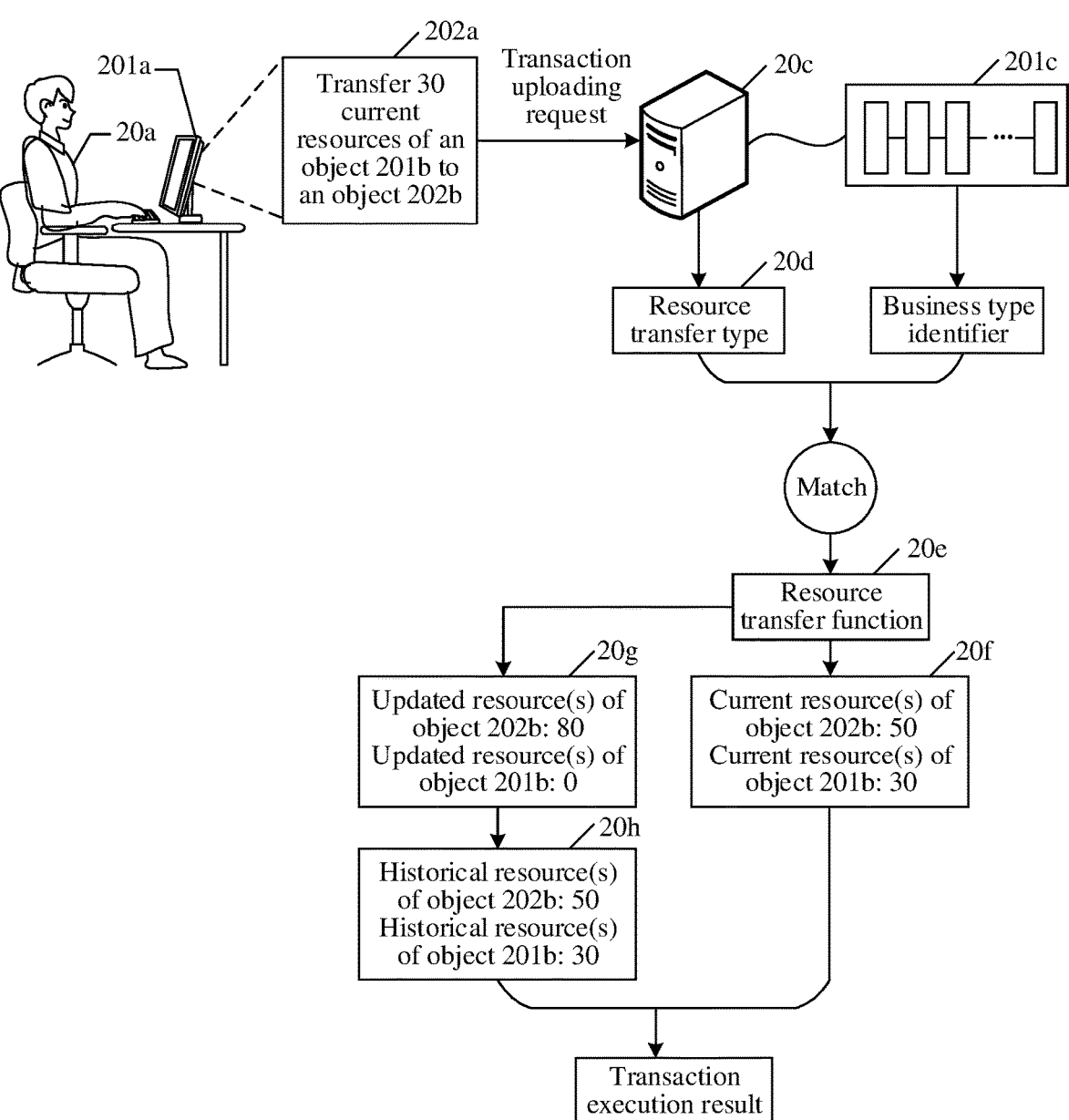
FIG. 3 is a schematic diagram of a blockchain-based data processing scenario according to an embodiment of the present disclosure.

The business device in one embodiment of the present disclosure is a device that generates a business transaction and transmits the business transaction to the side blockchain. The business device includes but is not limited to a terminal device or a business server. The business server may be an independent physical server, or may be a server cluster formed by a plurality of physical servers, or a distributed system, and may further be a cloud server that provides basic cloud computing services such as a cloud database, a cloud service, cloud computing, a cloud function, cloud storage, a network service, cloud communication, a middleware ser-vice, a domain name service, a security service, a CDN, big data, and an artificial intelligence platform. The terminal device includes but is not limited to a mobile phone, a computer, an intelligent voice interaction device, a smart home appliance, an on-board terminal, an aircraft, and the like. FIG. 3 is a schematic diagram of a blockchain-based data processing scenario according to an embodiment of the present disclosure. As shown in FIG. 3, a business object 20*a* operates a business device 201*a* to generate a business transaction 202*a*, that is, "transferring 30 current resources of an object 201*b* to an object 202*b*". If the business object 20*a* authorizes the business device 201*a* to transmit the business transaction 202*a* to a side blockchain 201*c* (that is, a side blockchain Z), the business device 201*a* generates a transaction on-chain request that carries the business trans-action 202*a*, and then transmits the transaction on-chain request to a side chain node 20*c* belonging to the side blockchain 201*c*.

In S102: generate business transaction digest information corresponding to a business transaction based on a transac-tion sequence number, a business type identifier, and a transaction execution result when the transaction execution result and the business transaction are successfully stored in a side blockchain.

The transaction sequence number is used for representing a sequence number of the business transaction in the side blockchain, and the business type identifier is used for representing a business type of a business processed by the side blockchain.

In S103: transmit the business transaction digest infor-mation to a main blockchain, so that the main blockchain stores the business transaction digest information.

In one embodiment of the present disclosure, when the side chain node obtains the transaction on-chain request transmitted by the business device that carries the business transaction, the transaction execution result corresponding to the business transaction may be determined based on the transaction on-chain request. The side chain node belongs to the side blockchain in a consortium blockchain, and the consortium blockchain further includes the main blockchain. Further, the side chain node performs on-chain processing on the transaction execution result and the business transaction, that is, stores the transaction execution result and the business transaction in the side blockchain. Further, the side chain node may generate the business transaction digest information corresponding to the business transaction based on the transaction sequence number, the business type identifier, and the transaction execution result, and transmit the business transaction digest information to the main blockchain, so that the main blockchain stores the business transaction digest information. The business transaction digest information stored in the main blockchain is used for being transmitted to a verification device by the main blockchain, the verification device being configured to verify validity of the business transaction digest information based on the transaction execution result obtained from the side blockchain. It may be learned from the foregoing that the side chain node belonging to the side blockchain may execute the business transaction matching the business type of the business processed by the side blockchain, and store the transaction execution result and the business transaction in the side blockchain. Therefore, the defect that the main blockchain in the blockchain network is overloaded in executing the business transaction can be avoided, and then computing resources of the main blockchain can be reduced. Since the main blockchain stores only the business transaction digest information, a storage resource of the main blockchain can be reduced.

In some embodiments, the determining a transaction execution result corresponding to the business transaction based on the transaction on-chain request includes: determining a business type of the business transaction, and calling a transaction execution function in a smart contract that matches the business type of the business transaction based on the transaction on-chain request when the business type of the business transaction matches the business type identifier; obtaining historical state values of a second business object in the business transaction based on the transaction execution function, and combining the historical state values of the second business object into a read set of the business transaction; executing the transaction execution function based on the business transaction and the read set, and obtaining the updated state values of a first business object in the business transaction generated during execution of the transaction execution function; determining the updated state values of the first business object as the write set of the business transaction, obtaining state values of the first business object before the execution of the transaction execution function, and determining the obtained state values as the historical write set of the business transaction; and determining the transaction execution result corresponding to the business transaction based on the write set, the historical write set, and the read set.

After obtaining the transaction on-chain request, the side chain node 20c first verifies the business type of the business transaction 202a, and then determines a business type 20d of the business transaction 202a. FIG. 3 shows that the business type 20d of the business transaction 202a is a resource transfer type. Further, the side chain node 20c matches the business type 20d (that is, the resource transfer type) with the business type of the business processed by the side blockchain 201c. The business type may be represented by the business type identifier. If the business type 20d does not match the business type identifier, for example, the business type identifier indicates that the business type of the business processed by the side blockchain 201c is a digital product authentication type, in this case, the side chain node 20c may refuse to process the transaction on-chain request transmitted by the business device 201a. If the business type 20d matches the business type identifier, in this case, the side chain node 20c calls, based on the transaction on-chain request, a transaction execution function 20e in the smart contract that matches the resource transfer type. The transaction execution function 20e is, for example, a resource transfer function shown in FIG. 3.

The side chain node 20c may determine disk reading data of the business transaction of "transferring 30 current resources of an object 201b to an object 202b" based on the transaction execution function 20e, that is, the current resources of the object 201b and current resources of the object 202b. FIG. 3 shows that the current resources of the object 201b are 30 and the current resources of the object 202b are 50. The side chain node 20c determines read state data as a read set 20f. Further, the side chain node 20c executes the transaction execution function 20e based on the read set 20f and the business transaction 202a. After the business transaction 202a is executed, an updated state value of the object 201b and an updated state value of the object 202b are obtained. The updated state value of the object 201b is, for example, updated resource(s) of the object 201b: 0 shown in FIG. 3, the updated state value of the object 202b is, for example, updated resource(s) of the object 202b: 80 shown in FIG. 3, and state data that needs to be written to a disk after the execution of the business transaction 202a is determined as a write set 20g. Further, the side chain node 20c obtains historical state data of the state data that needs to be written to the disk, and determines the obtained state data as a historical write set 20h. The first business object is a business object corresponding to the state data that needs to be written to the disk after the execution of the business transaction. The second business object is a business object corresponding to the state data that needs to be read from the disk during the execution of the business transaction. In FIG. 3, the first business object is the same as the second business object, that is, the side chain node 20c reads historical state values respectively corresponding to the object 201b and the object 202b, such as current resource(s) of the object 202b: 50 in FIG. 3 and current resource(s) of the object 201b: 30. In addition, the side chain node 20c also writes the updated state values respectively corresponding to the object 201b and the object 202b, such as updated resource(s) of the object 202b: 80 in FIG. 3 and updated resource(s) of the object 201b: 0. In the foregoing scenario, the historical write set 20h includes historical resource(s) of the object 202b: 50 and historical resource(s) of the object 201b: 30. In practical application, the first business object may be different from the second business object, for example, a transaction of "creating an object 202z and transferring 30 current resources of an object 204b to the object 202b". In this case, the first business object includes the object 204b and the object 202z, and the second business object includes the object 204b.

Referring to FIG. 3 again, the side chain node 20c determines the transaction execution result corresponding to the business transaction 202a based on the write set 20g, the historical write set 20h, and the read set 20f. Contents of the transaction execution result are not limited in one embodiment of the present disclosure, which may be set based on a practical application scenario. Specifically, the transaction execution result may further include a relevant parameter during the execution of the business transaction, for example, at least one of error code, a height of a transaction, or a transaction hash value.

In one embodiment, if the business type of the business transaction matches the business type identifier, the transaction execution function in a smart contract that matches the business type of the business transaction is called based on the transaction on-chain request, to determine the transaction execution result corresponding to the business transaction, so that the transaction execution function is called to generate the transaction execution result when the business type of the business transaction matches the business type identifier, thereby ensuring correctness of the transaction execution result.

In some embodiments, the method further includes: updating a historical state tree based on the transaction execution result, to obtain an updated state tree, the historical state tree being a Merkle tree generated based on a full amount of historical state values in the side blockchain; and the generating business transaction digest information corresponding to the business transaction based on a transaction sequence number, a business type identifier, and the transaction execution result includes: generating the business transaction digest information corresponding to the business transaction based on the transaction sequence number, the business type identifier, the transaction execution result, the historical state tree, and the updated state tree.

Figure 4:
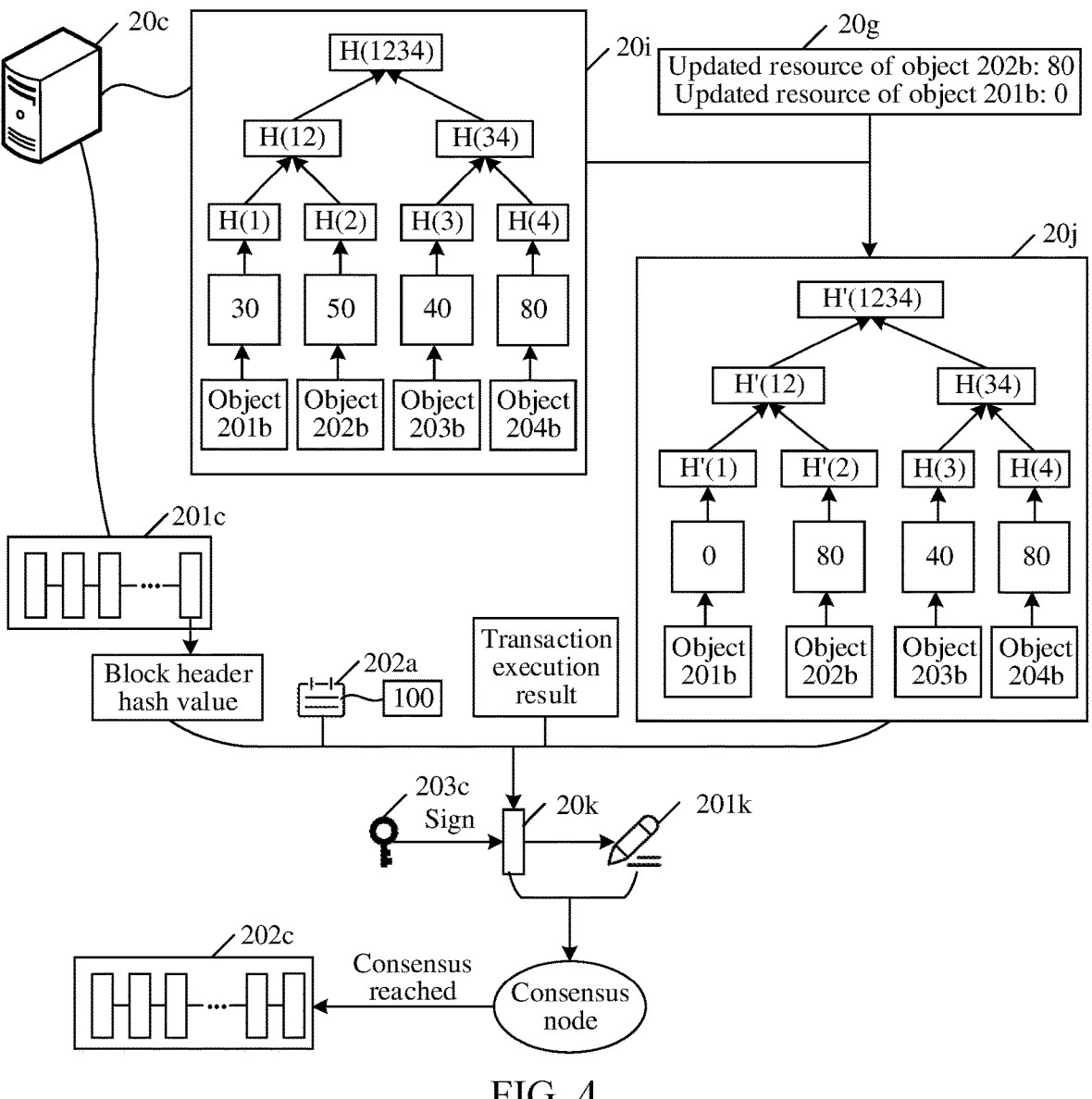
FIG. 4 is a schematic diagram of another blockchain-based data processing scenario according to an embodiment of the present disclosure.

The side blockchain $201c$ maintains a state tree including state data respectively corresponding to all business objects. FIG. 4 is a schematic diagram of another blockchain-based data processing scenario according to an embodiment of the present disclosure. As shown in FIG. 4, before execution of the business transaction $202a$, the side blockchain $201c$ maintains a historical state tree $20i$. It is to be emphasized that for convenience of description and understanding, a total quantity of full business objects in one embodiment of the present disclosure is 4, which are respectively an object $201b$, an object $202b$, an object $203b$, and an object $204b$. In practical application, the total quantity corresponding to the full business objects may be any positive integer.

The historical state tree $20i$ includes a historical state value 1 corresponding to the object $201b$ (that is, 30 in FIG. 4), a historical state value 2 corresponding to the object $202b$ (that is, 50 in FIG. 4), a historical state value 3 corresponding to the object $203b$ (that is, 40 in FIG. 4), and a historical state value 4 corresponding to the object $204b$ (that is, 80 in FIG. 4). In addition, the historical state tree $20i$ further includes a hash value 1 corresponding to the historical state value 1 (that is, H(1) in FIG. 4), a hash value 2 corresponding to the historical state value 2 (that is, H(2) in FIG. 4), a hash value 3 corresponding to the historical state value 3 (that is, H(3) in FIG. 4), and a hash value 4 corresponding to the historical state value 4 (that is, H(4) in FIG. 4). Further, the historical state tree $20i$ further includes a hash value corresponding to H(1) and H(2) (such as H(12) in FIG. 4), and a hash value corresponding to H(3) and H(4) (such as H(34) in FIG. 4). In addition, the historical state tree $20i$ further includes a hash value corresponding to H(12) and H(34) (such as H(1234) in FIG. 4), the hash value being a Merkle tree root of the historical state tree $20i$.

The side chain node $20c$ obtains the transaction execution result upon completion of the execution of the business transaction $202a$, and updates the historical state tree $20i$ based on the transaction execution result. Specifically, the historical state tree $20i$ is updated based on state data in the write set $20g$. As shown in FIG. 4, the side chain node $20c$ updates the historical state value of the object $201b$ to the updated state value of the object $201b$, that is, updates 30 to 0, and updates the historical state value of the object $202b$ to the updated state value of the object $202b$, that is, updates 50 to 80. In this case, the side chain node $20c$ generates a hash value corresponding to the updated state value of the object $201b$ (such as H'(1) in FIG. 4), and a hash value corresponding to the updated state value of the object $202b$ (such as H'(2) in FIG. 4). Further, hash calculation is performed on H'(1) and H'(2) to obtain H'(12). Further, hash calculation is performed on H'(12) and H(34) to obtain H'(1234). In this case, the side chain node $20c$ may obtain an updated state tree $20j$.

In one embodiment, the business transaction digest information corresponding to the business transaction is generated based on the transaction sequence number, the business type identifier, the transaction execution result, the historical state tree, and the updated state tree. Therefore, the business transaction digest information includes the historical state tree and the updated state tree, thereby enhancing the validity of the business transaction digest information.

In some embodiments, the performing on-chain processing on the transaction execution result and the business transaction includes: obtaining a block having a maximum generation timestamp from the side blockchain Z when the side chain node has a consensus permission, using the block as a parent block, and using a block header hash value of the parent block as a parent block hash value; generating a side chain block based on the parent block hash value, the business transaction carrying the transaction sequence number, the transaction execution result, and the updated state tree generated based on the transaction execution result, a generation timestamp of the side chain block being used for updating a maximum generation timestamp of the side blockchain Z; signing the side chain block by using a node private key corresponding to the side chain node, to obtain signature information, and broadcasting the side chain block carrying the signature information to a consensus node in the side blockchain Z; and adding the side chain block to the side blockchain Z, and returning the transaction sequence number to the business device when it is determined that the consensus nodes in the side blockchain Z reach a consensus on the side chain block.

For example, if the side chain node $20c$ is a node in the side blockchain $201c$ that has a consensus permission and a block generation permission, that is, the consensus node in the side blockchain $201c$, the block having the maximum generation timestamp is obtained from the side blockchain $201c$ and is used as the parent block. Referring to FIG. 4 again, the side chain node $20c$ uses the block having the largest block height as the parent block, and uses the block header hash value of the parent block as the parent block hash value. A side chain block $20k$ is generated based on the parent block hash value, the business transaction $202a$ carrying the transaction sequence number, the transaction execution result, and the updated state tree $20j$. For example, in FIG. 4, a sequence number of the business transaction $202a$ in the side blockchain $201c$ is 100. Further, the side chain node $20c$ signs the side chain block $20k$ by using a node private key $203c$ corresponding to the side chain node $20c$, to obtain signature information $201k$. The side chain block $20k$ carrying the signature information $201k$ is broadcast to the consensus node in the side blockchain $201c$, so that the consensus node in the side blockchain $201c$ can perform consensus processing on the side chain block 20*k*. The side chain node 20*c* adds the side chain block 20*k* to the side blockchain 201*c* when it is determined that the consensus node in the side blockchain 201*c* reaches consensus on the side chain block 20*k*, to obtain a side blockchain 202*c*, and simultaneously returns the transaction sequence number to the business device 201*a*.

In one embodiment, the side blockchain is an independent blockchain, which may perform consensus processing on the business transaction associated with the business type of a business processed by the side blockchain and store full data. Therefore, consensus load of the main blockchain can be reduced, and storage pressure of the main blockchain can be relieved.

In some embodiments, the generating the business transaction digest information corresponding to the business transaction based on the transaction sequence number, the business type identifier, the transaction execution result, the historical state tree, and the updated state tree includes: obtaining a historical state root hash of the historical state tree, and obtaining a first target field value from the historical state root hash; obtaining an updated state root hash of the updated state tree, and obtaining a second target field value from the updated state root hash; and generating the business transaction digest information corresponding to the business transaction based on the transaction sequence number, the business type identifier, the transaction execution result, the first target field value, and the second target field value. The updated state tree belongs to the Merkle tree, the root hash is the root of the Merkle tree, and the updated state root hash is a root node of the updated state tree.

Figure 5:
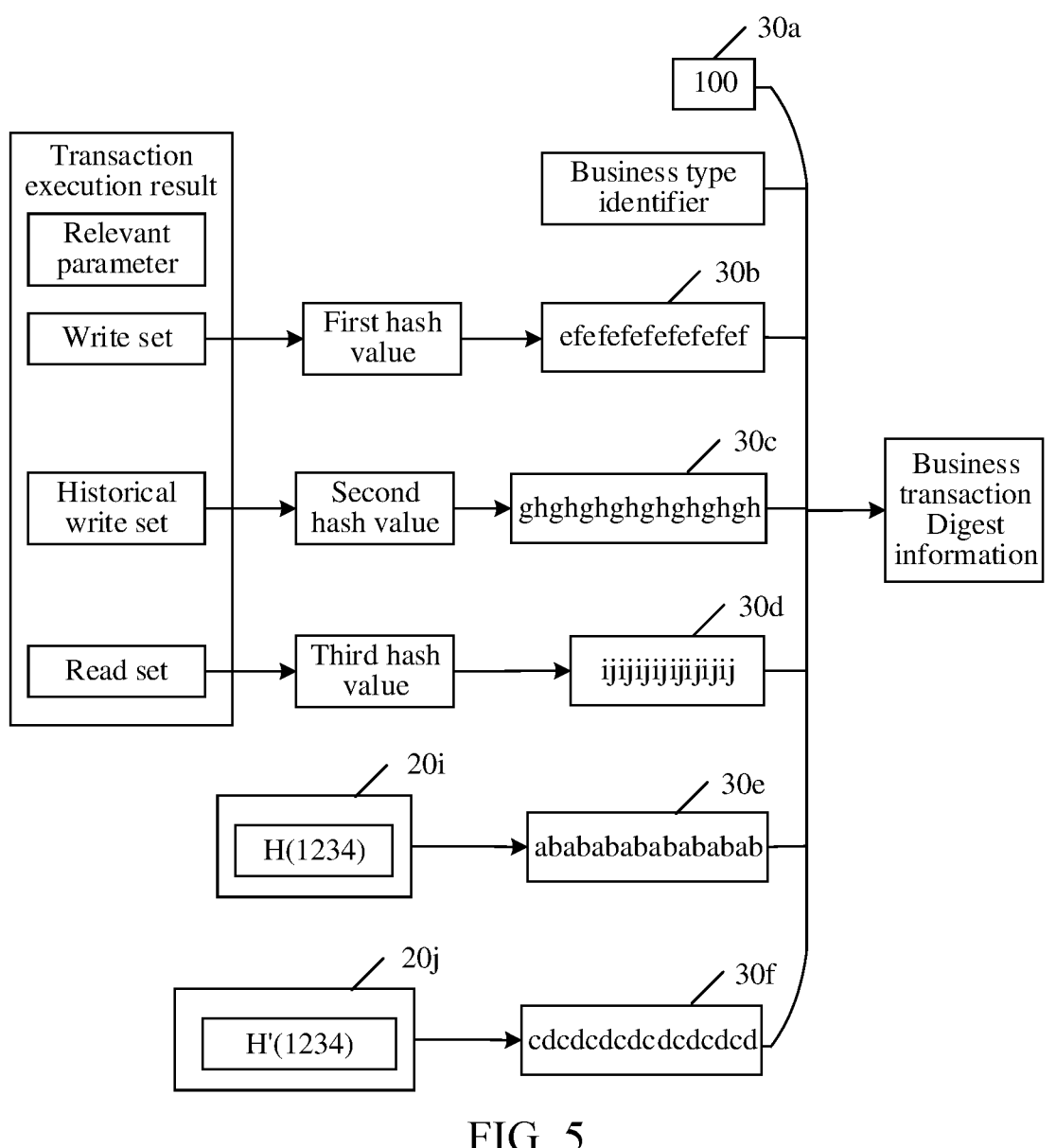
FIG. 5 is a schematic structural diagram of business transaction digest information according to an embodiment of the present disclosure.

If the side chain block including the transaction execution result and the business transaction is stored in the side blockchain Z, the side chain node generates the business transaction digest information corresponding to the business transaction. FIG. 5 is a schematic structural diagram of business transaction digest information according to an embodiment of the present disclosure. As shown in FIG. 5, a side chain node obtains a historical state root hash of a historical state tree 20*i*, such as H(1234) in FIG. 4 and FIG. 5, and obtains a first target field value 30*e* from the historical state root hash. A value range of the first target field value 30*e* is not limited in one embodiment of the present disclosure, which may be set based on practical application, for example, first 16 bits, last 8 bits, or the first 8 bits plus the last 8 bits of the historical state root hash. For convenience of description and understanding in one embodiment of the present disclosure, the first 16 bits of the historical state root hash are used as an example, such as abababababababab in FIG. 5. Further, the side chain node obtains the updated state root hash of the updated state tree 20*j*, such as the H'(1234) in FIG. 4 and FIG. 5, and obtains a second target field value 30*f* from the updated state root hash. For the meaning corresponding to the second target field value, reference is made to the definition of the first target field value. cdcdcdcdcdcdcdcd is used as an example of the second target field value 30*f* in FIG. 5.

In one embodiment, considering a large storage capacity of the full data of the business transaction (including the transaction execution result), the business transaction digest information for the business transaction is generated in one embodiment of the present disclosure, and a storage capacity corresponding to the business transaction digest information is less than the storage capacity of the full data of the business transaction. The business transaction digest information is transmitted to the main blockchain and stored, which not only can allow the main blockchain to store data related to the business transaction, but also can reduce the storage pressure of the main blockchain.

In some embodiments, the updating a historical state tree based on the transaction execution result, to obtain an updated state tree includes: updating the historical state tree based on a write set in the transaction execution result, to obtain the updated state tree, the full amount of historical state values including a historical write set in the transaction execution result, the write set including updated state values of a first business object in the business transaction, and the historical write set including historical state values of the first business object; and the generating the business transaction digest information corresponding to the business transaction based on the transaction sequence number, the business type identifier, the transaction execution result, the first target field value, and the second target field value including: generating a first hash value of the write set, and obtaining a third target field value from the first hash value; generating a second hash value of the historical write set, and obtaining a fourth target field value from the second hash value; generating a third hash value of a read set in the transaction execution result, and obtaining a fifth target field value from the third hash value, the read set including historical state values of a second business object in the business transaction; and combining the transaction sequence number, the business type identifier, the third target field value, the fourth target field value, the fifth target field value, the first target field value, and the second target field value into the business transaction digest information corresponding to the business transaction.

For the meanings respectively corresponding to the third target field value, the fourth target field value, and the fifth target field value, reference is made to the definition of the first target field value.

Further, it may be learned from step S101 that the transaction execution result may include the write set, the historical write set, and the read set. The side chain node generates the first hash value of the write set, and obtains a third target field value 30*b* from the first hash value. efefefefefefefef is used as an example of the third target field value 30*b* in FIG. 5. The side chain node generates the second hash value of the historical write set, and obtains a fourth target field value 30*c* from the second hash value. ghghghghghghghgh is used as an example of the fourth target field value 30*c* in FIG. 5. The side chain node generates the third hash value of the read set, and obtains a fifth target field value 30*d* from the third hash value. ijijijijijijijin is used as an example of the fifth target field value 30*d* in FIG. 5. Further, the side chain node combines the transaction sequence number (a sequence number 100 is used as an example in FIG. 5), the business type identifier, the third target field value 30*b*, the fourth target field value 30*c*, the fifth target field value 30*d*, the first target field value 30*e*, and the second target field value 30*f* into the business transaction digest information corresponding to the business transaction.

In one embodiment, considering a large storage capacity of the full data of the business transaction (including the transaction execution result), the business transaction digest information for the business transaction is generated in one embodiment of the present disclosure, and a storage capacity corresponding to the business transaction digest information is far less than the storage capacity of the full data of the business transaction. The business transaction digest information is transmitted to the main blockchain and stored, which not only can allow the main blockchain to store data related to the business transaction, but also can reduce the storage pressure of the main blockchain.

In some embodiment, the transmitting the business transaction digest information to the main blockchain includes: encrypting the business transaction digest information by using a main chain public key of the main blockchain, to obtain encrypted digest information; and calling an information uploading function corresponding to the business type identifier in the main blockchain, uploading the encrypted digest information to the main blockchain through the information uploading function, so that a main chain node in the main blockchain decrypts the encrypted digest information by using a main chain private key of the main blockchain, and storing the business transaction digest information corresponding to a decryption success result when a decryption result is the decryption success result.

Figure 6:
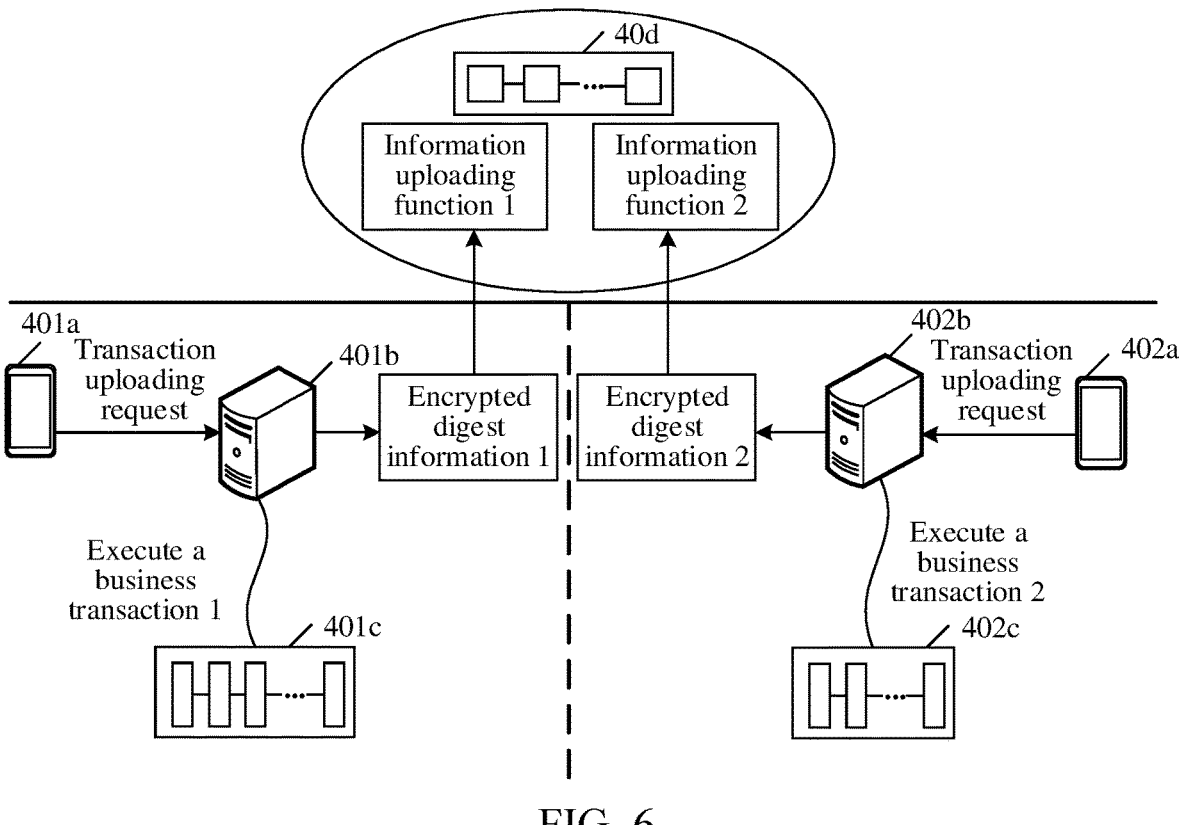
FIG. 6 is a schematic diagram of another blockchain-based data processing scenario according to an embodiment of the present disclosure.

Considering that the business transaction digest information may be obtained by an illegal device during transmission and modified by the illegal device, before transmission of the business transaction digest information, the side chain node encrypts the business transaction digest information by using the main chain public key of the main blockchain, to obtain the encrypted digest information. Further, the side chain node calls the information uploading function in the main blockchain that corresponds to the business type identifier, and uploads the encrypted digest information to the main blockchain through the information uploading function. FIG. 6 is a schematic diagram of another blockchain-based data processing scenario according to an embodiment of the present disclosure. A side chain node 401b maintains a side blockchain 401c to which the side chain node belongs. A side chain node 402b maintains a side blockchain 402c to which the side chain node belongs. A business type of a business processed by the side blockchain 401c is different from a business type of a business processed by the side blockchain 402c, and both the blockchains independently perform on-chain processing. Therefore, blocks stored in the side blockchain 401c are different from blocks stored in the side blockchain 402c. Blocks stored in a main blockchain 40d are also different from those stored in the side blockchain 401c and the side blockchain 402c. For a process of transmitting the transaction on-chain request to the side chain node 401b by a business device 401a, a process of executing a business transaction 1 by the side chain node 401b, a process of generating encrypted digest information corresponding to the business transaction 1 (which is referred to as encrypted digest information 1 in FIG. 6) by the side chain node 401b, a process of transmitting the transaction on-chain request to the side chain node 402b by a business device 402a, a process of executing a business transaction 2 by the side chain node 402b, and a process of generating encrypted digest information corresponding to the business transaction 2 (which is referred to as encrypted digest information 2 in FIG. 6) by the side chain node 402b, reference is made to the description of step S101 to step S102 above.

As shown in FIG. 6, an information uploading function 1 is used for transmitting the encrypted digest information 1 uploaded by the side blockchain 401c, and an information uploading function 2 is used for transmitting the encrypted digest information 2 uploaded by the side blockchain 402c. The main chain node decrypts the encrypted digest information 1 by using the main chain private key of the main blockchain when obtaining the encrypted digest information 1. When the decryption result is the decryption success result, the main chain node stores the business transaction digest information corresponding to the decryption success result. A process of processing the encrypted digest information 2 by the main chain node is the same as the processing process for the encrypted digest information 1.

For the process of transmitting the business transaction digest information to the verification device by the main blockchain, and the process of verifying the validity of the business transaction digest information by the verification device based on the transaction execution result obtained from the side blockchain Z, reference is made to the description of an embodiment corresponding to FIG. 9 below.

In one embodiment, since the business transaction digest information may be obtained by the illegal device during transmission and modified by the illegal device, the business transaction digest information is encrypted and transmitted to the main blockchain, which improves security of information transmission.

FIG. 7 is a schematic flowchart of another blockchain-based data processing method according to an embodiment of the present disclosure. The blockchain-based data processing method may be performed by a side chain node in a side blockchain Z of a consortium blockchain. The consortium blockchain may be the consortium blockchain 100 in FIG. 1. The side blockchain Z may be any side blockchain in FIG. 1. As shown in FIG. 7, the method may include at least the following steps.

Step S201: obtain a transaction on-chain request transmitted by a business device that carries a business transaction, determine a transaction execution result corresponding to the business transaction based on the transaction on-chain request, and perform on-chain processing on the transaction execution result and the business transaction.

In S202: generate business transaction digest information corresponding to a business transaction based on a transaction sequence number, a business type identifier, and a transaction execution result when the transaction execution result and the business transaction are successfully stored in a side blockchain, the transaction sequence number being used for representing a sequence number of the business transaction in the side blockchain, and the business type identifier being used for representing a business type of a business processed by the side blockchain.

In S203: transmit the business transaction digest information to a main blockchain, so that the main blockchain stores the business transaction digest information, the business transaction digest information stored in the main blockchain being used for being transmitted to a verification device by the main blockchain, the verification device being configured to verify validity of the business transaction digest information based on the transaction execution result obtained from the side blockchain.

In S204: generate a Merkle path for the updated state values based on the updated state tree, and generate a Merkle path for the historical state values based on the historical state tree.

Specifically, a Merkle path for updated state values $B_c$ is generated based on the updated state tree, and a Merkle path for historical state values $D_c$ is generated based on the historical state tree. The transaction execution result includes a write set corresponding to the business transaction and a historical write set corresponding to the business transaction. The write set includes the updated state values $B_c$, c being a positive integer and c is less than or equal to a total quantity of the updated state values in the write set. The historical write set includes the historical state values $D_c$.

Figure 8:
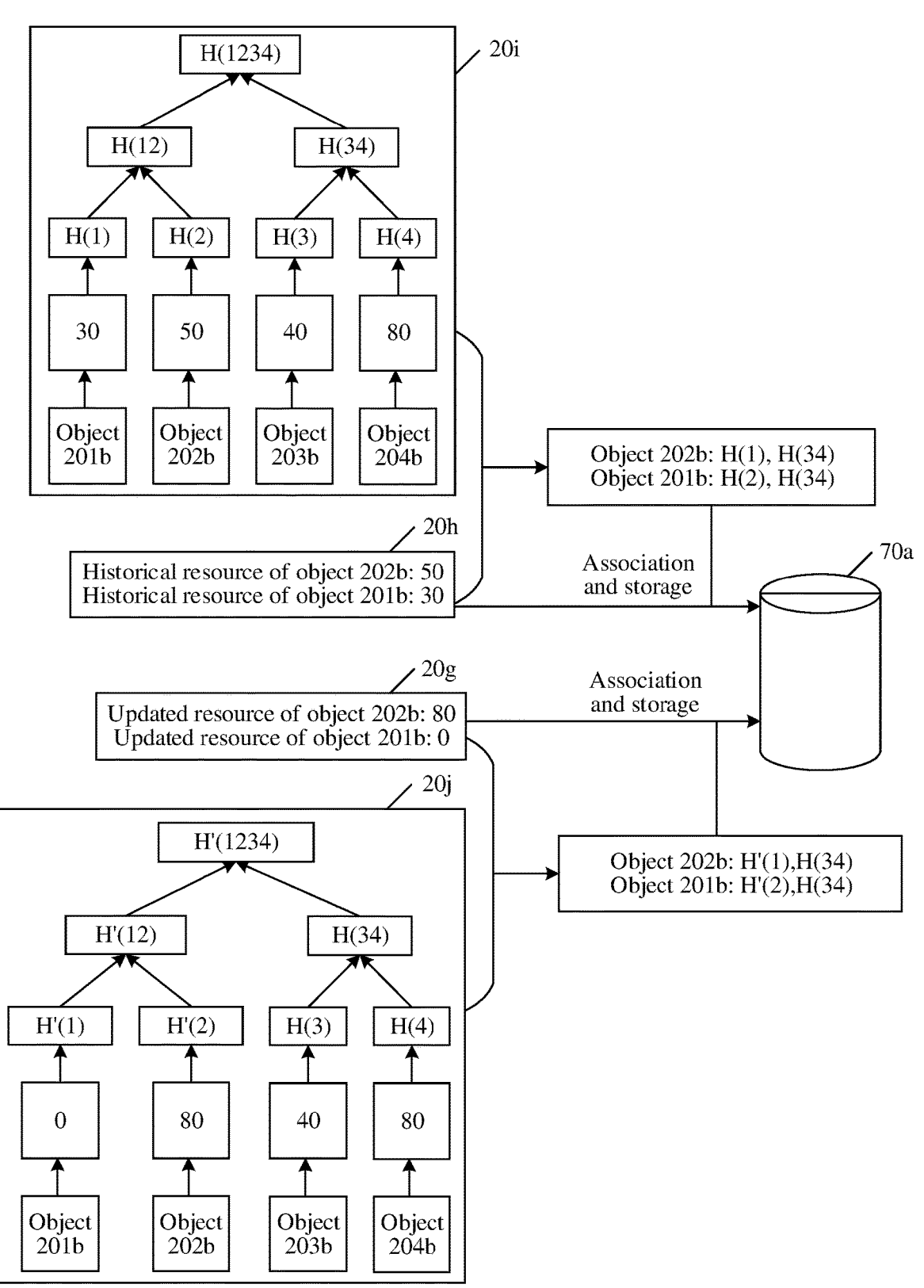
FIG. 8 is a schematic diagram of another blockchain-based data processing scenario according to an embodiment of the present disclosure.

When the transaction execution result and the business transaction are successfully stored in the side blockchain, the side chain node additionally maintains the Merkle paths corresponding to all state values in the write set, and the Merkle paths corresponding to all state values in the historical write set. The Merkle paths of the foregoing two types are not stored on the chain. Therefore, the consensus node of the side blockchain does not need to perform consensus. FIG. 8 is a schematic diagram of another blockchain-based data processing scenario according to an embodiment of the present disclosure. As shown in FIG. 8, for meanings respectively corresponding to a historical write set 20h, a write set 20g, a historical state tree 20i, and an updated state tree 20j, reference is made to the descriptions in FIG. 3 to FIG. 5 above. For a historical resource value 50 of the historical write set 20h, a Merkle path 1 corresponding to the historical resource value includes H(1) and H(34). For a historical resource value 30 of the historical write set 20h, a Merkle path 2 corresponding to the historical resource value includes H(2) and H(34). For an updated resource value 80 of the write set 20g, a Merkle path 3 corresponding to the updated resource value includes H'(1) and H(34). For an updated resource value 0 of the write set 20g, a Merkle path 4 corresponding to the updated resource value includes H'(2) and H(34).

In S205: store the Merkle path corresponding to an updated state value (e.g., each updated state value) of the updated state values in the write set in association with the write set, and store the Merkle path corresponding to a historical state value (e.g., each historical state value) of the historical state values in the historical write set in association with the historical write set.

Specifically, referring to FIG. 8 again, the side chain node stores, in a database 70a in association with the write set 20g, the Merkle path corresponding to each updated state value (such as each updated resource value in FIG. 8) in the write set 20g. The side chain node stores, in the database 70a in association with the historical write set 20h, the Merkle path corresponding to a historical state value (such as each historical resource value in FIG. 8) in the historical write set 20h.

In some embodiments, the execution process of step S204 to step S205 may precede the execution process of step S202 to step S203. In other embodiments, the execution process of step S204 to step S205 is synchronized with the execution process of step S202 to step S203.

In one embodiment of the present disclosure, when the side chain node obtains the transaction on-chain request transmitted by the business device that carries the business transaction, the transaction execution result corresponding to the business transaction may be determined based on the transaction on-chain request. The side chain node belongs to the side blockchain Z in a consortium blockchain, and the consortium blockchain further includes the main blockchain. Further, the side chain node performs on-chain processing on the transaction execution result and the business transaction, that is, stores the transaction execution result and the business transaction in the side blockchain Z. Further, the side chain node may generate the business transaction digest information corresponding to the business transaction based on the transaction sequence number, the business type identifier, and the transaction execution result, and transmit the business transaction digest information to the main blockchain, so that the main blockchain stores the business transaction digest information. The business transaction digest information stored in the main blockchain is used for being transmitted to a verification device by the main blockchain, the verification device being configured to verify validity of the business transaction digest information based on the transaction execution result obtained from the side blockchain Z. It may be learned from the foregoing that the side chain node belonging to the side blockchain Z may execute the business transaction matching the business type of the business processed by the side blockchain Z, and store the transaction execution result and the business transaction in the side blockchain Z. Therefore, the defect that the main blockchain in the blockchain network is overloaded in executing the business transaction can be avoided, and then computing resources of the main blockchain can be reduced. Since the main blockchain stores only the business transaction digest information, a storage resource of the main blockchain can be reduced.

In some embodiments, the business transaction digest information stored in the main blockchain is used for being transmitted to a verification device by the main blockchain, the verification device being configured to verify validity of the business transaction digest information based on the transaction execution result obtained from the side blockchain Z.

Specifically, the transaction execution result stored in the side blockchain Z and the business transaction digest information stored in the main blockchain may be both transmitted to the verification device, so that the verification device can verify the transaction execution result transmitted by the side blockchain Z and the business transaction digest information transmitted by the main blockchain.

In one embodiment, the verification device may verify the transaction execution results transmitted by the side blockchain Z and the business transaction digest information transmitted by the main blockchain, so that validity of the business transaction digest information can be determined, and security of the blockchain network can be ensured.

FIG. 9 is a schematic flowchart of another blockchain-based data processing method according to an embodiment of the present disclosure. The method is performed by a verification device. As shown in FIG. 9, the method may include at least the following steps.

In S301: transmit a first data obtaining request carrying a business type identifier and a transaction sequence number to a main blockchain in a consortium blockchain, so that the main blockchain returns business transaction digest information to the verification device, the transaction sequence number being used for representing a sequence number of a business transaction in a side blockchain, the side blockchain belonging to the consortium blockchain, the business transaction digest information being transmitted from the side blockchain to the main blockchain, the business transaction digest information being generated by a first side chain node in the side blockchain when a transaction execution result and the business transaction are successfully stored in the side blockchain, and the business transaction digest information being generated based on the transaction sequence number, the business type identifier, and the transaction execution result, the transaction execution result being determined by the first side chain node based on a transaction on-chain request when the transaction on-chain request transmitted by a business device is obtained, the transaction on-chain request carrying the business transaction, and the business type identifier being used for representing a business type of a business processed by the side blockchain.

The business transaction digest information is generated based on the transaction sequence number, the business type identifier, and the transaction execution result by a first side chain node in the side blockchain when a transaction execution result and the business transaction are successfully stored in the side blockchain.

In one embodiment of the present disclosure, the verification device may be a non-blockchain node device and has a verification requirement, including but not limited to the business device described in FIG. 2. When the verification device is not a business device, the verification device may first obtain the transaction sequence number corresponding to the business transaction from the business device, or the side chain node transmits the transaction sequence number to the verification device. A manner in which the verification device obtains the transaction sequence number is not limited in one embodiment of the present disclosure, which may be set based on a practical application scenario.

Figure 10:
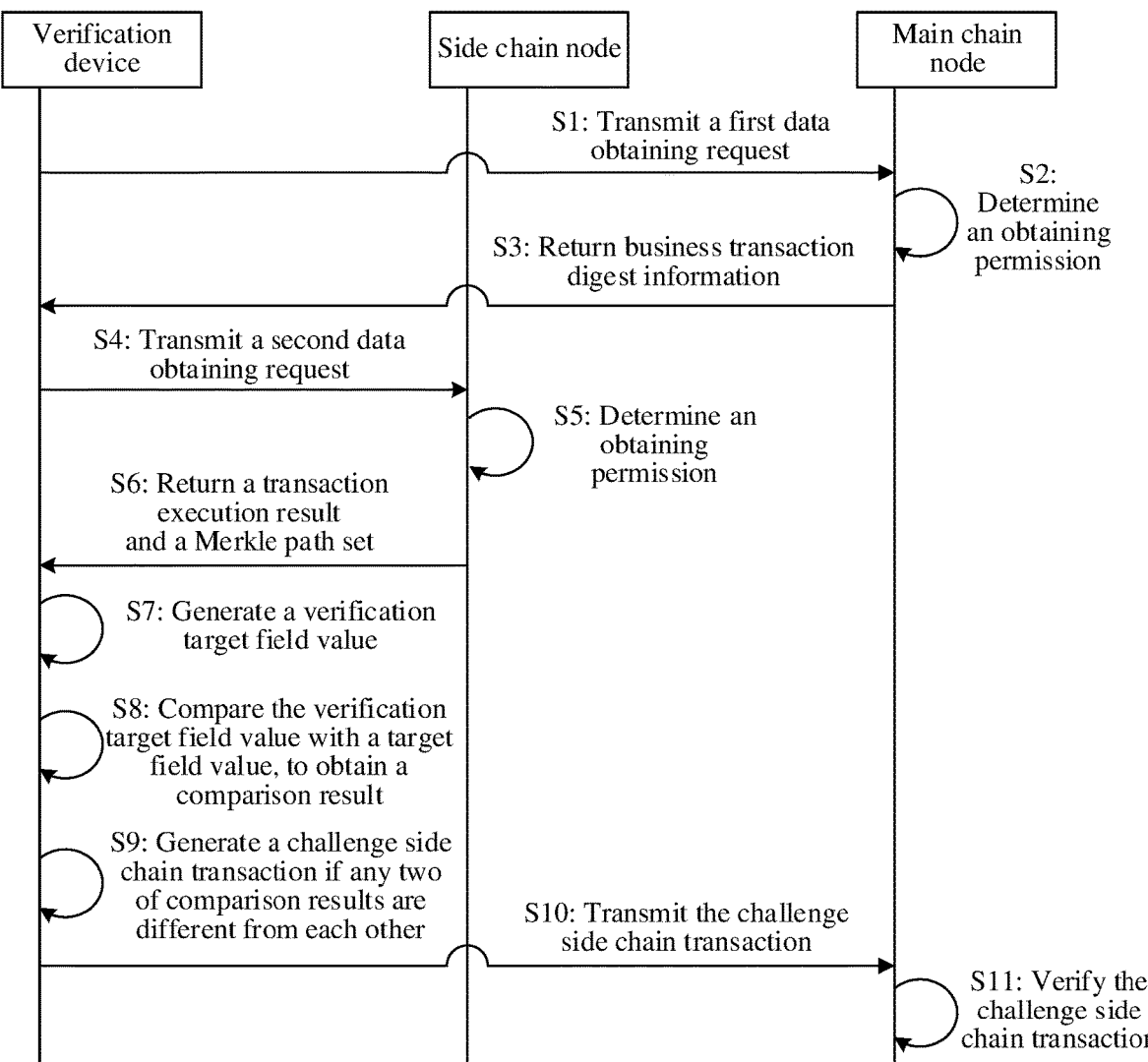
FIG. 10 is an interactive flowchart of a blockchain-based data processing method according to an embodiment of the present disclosure.

FIG. 10 is an interactive flowchart of a blockchain-based data processing method according to an embodiment of the present disclosure. As shown in FIG. 10, the method includes the following exemplary steps. In S1: a verification device transmits a first data obtaining request to a main chain node. A main blockchain to which the main chain node belongs and a side blockchain to which the side chain node belongs form a consortium blockchain. A quantity of the side blockchains in the consortium blockchain is not limited in one embodiment of the present disclosure, which may be set based on a practical application scenario. The first data obtaining request carries a business type identifier and a transaction sequence number. In S2: the main chain node determines an obtaining permission. The main chain node verifies the verification device based on the business type identifier and the transaction sequence number, to determine that the verification device has an obtaining permission, which may specifically include: determining, by the main chain node based on the business type identifier and the transaction sequence number, whether corresponding business transaction digest information may be obtained from the main blockchain, and determining that the verification device has a first obtaining permission if the business transaction digest information including the business type identifier and the transaction sequence number may be obtained. In S3: the main chain node returns the business transaction digest information including the business type identifier and the transaction sequence number to the verification device in a scenario where the verification device has the first obtaining permission.

In S302: transmit a second data obtaining request carrying the transaction sequence number to the side blockchain, so that a second side chain node in the side blockchain returns a transaction execution result associated with the transaction sequence number to the verification device.

In S303: verify validity of the business transaction digest information based on the transaction execution result.

A first side chain node and the second side chain node may be any side chain node in a side blockchain Z. The first side chain node and the second side chain node may be different side chain nodes in the side blockchain Z, or may be the same side chain node in the side blockchain Z, which is not limited herein.

It may be learned from the foregoing that the side chain node belonging to the side blockchain Z may execute the business transaction matching the business type of the business processed by the side blockchain Z, and store the transaction execution result and the business transaction in the side blockchain Z. Therefore, the defect that the main blockchain in the blockchain network is overloaded in executing the business transaction can be avoided, and then computing resources of the main blockchain can be reduced. Since the main blockchain stores only the business transaction digest information, a storage resource of the main blockchain can be reduced. In addition, the transaction execution result stored in the side blockchain Z and the business transaction digest information stored in the main blockchain may be both transmitted to the verification device, so that the verification device can verify the transaction execution result transmitted by the side blockchain Z and the business transaction digest information transmitted by the main blockchain. In this way, the validity of the business transaction digest information can be determined, and security of the blockchain network can be ensured.

In some embodiments, the business transaction digest information is returned when the main blockchain determines that the verification device has the first obtaining permission for the business transaction digest information.

The first obtaining permission is a permission to obtain the business transaction digest information. The main blockchain determines, based on the business type identifier and the transaction sequence number, that the verification device has the first obtaining permission for the business transaction digest information.

In one embodiment, since the business transaction digest information is returned when it is determined that the verification device has the first obtaining permission, data security is improved.

In some embodiments, the transaction execution result is returned when the second side chain node determines that the verification device has a second obtaining permission.

The second obtaining permission is a permission to obtain the transaction execution result.

In one embodiment, since the transaction execution result is returned when it is determined that the verification device has the second obtaining permission, the data security is improved.

In some embodiments, the method further includes: obtaining a Merkle path set associated with the transaction sequence number returned by the second side chain node, the Merkle path set being returned when the second side chain node determines that the verification device has the second obtaining permission; and the verifying validity of the business transaction digest information based on the transaction execution result includes: verifying the validity of the business transaction digest information based on the transaction execution result and the Merkle path set.

The second side chain node returns the Merkle path set associated with the transaction sequence number to the verification device when determining that the verification device has the second obtaining permission.

In S4 of FIG. 10: the verification device transmits the second data obtaining request to the side chain node. The second data obtaining request carries the transaction sequence number. In S5: the side chain node determines the obtaining permission. Specifically, the side chain node authenticates the verification device. A manner of authenticating the verification device is not limited in one embodiment of the present disclosure, which may be set based on a practical application scenario. A main goal of authentication is to prevent the verification device from obtaining data for which the verification device has no permission, so as to ensure visibility of data in the side blockchain. In S6: the side chain node returns the transaction execution result and the Merkle path set. In a scenario where the verification device has the second obtaining permission, the side chain node returns the transaction execution result associated with the transaction sequence number and the Merkle path set associated with the transaction sequence number to the verification device. The Merkle path set may include the Merkle path corresponding to each updated state value in the write set in the embodiment corresponding to FIG. 2 above, and the Merkle path corresponding to each historical state value in the historical write set. The Merkle path set can improve the verification accuracy of the business transaction digest information.

In one embodiment, the validity of the business transaction digest information is verified based on the transaction execution result and the Merkle path set, and the verification accuracy of the business transaction digest information is improved through the Merkle path set.

In some embodiments, the verifying the validity of the business transaction digest information based on the transaction execution result and the Merkle path set includes: generating a first hash value of a write set in the transaction execution result, and obtaining a third verification target field value from the first hash value, the write set including updated state values of a first business object in the business transaction, and generating a second hash value of a historical write set in the transaction execution result, and obtaining a fourth verification target field value from the second hash value, the historical write set including historical state values of the first business object; and generating a third hash value of a read set in the transaction execution result, and obtaining a fifth verification target field value from the third hash value, the read set including historical state values of a second business object in the business transaction; and verifying the validity of the business transaction digest information based on the third verification target field value, the fourth verification target field value, the fifth verification target field value, the write set, the historical write set, the read set, and the Merkle path set.

The method for obtaining a third verification target field value from the first hash value is consistent with the method for obtaining a third target field value from the first hash value. The method for obtaining a fourth verification target field value from the second hash value is consistent with the method for obtaining a fourth target field value from the second hash value. The method for obtaining a fifth verification target field value from the third hash value is consistent with the method for obtaining a fifth target field value from the third hash value.

In one embodiment, the validity of the business transaction digest information is verified based on the third verification target field value, the fourth verification target field value, the fifth verification target field value, the write set, the historical write set, the read set, and the Merkle path set, thereby improving the accuracy of validity verification.

In some embodiments, the specific process of verifying the validity of the business transaction digest information is verified based on the third verification target field value, the fourth verification target field value, the fifth verification target field value, the write set, the historical write set, the read set, and the Merkle path set may include: comparing the third verification target field value with a third target field value in the business transaction digest information, to obtain a first comparison result; comparing the fourth verification target field value with a fourth target field value in the business transaction digest information, to obtain a second comparison result; comparing the fifth verification target field value with a fifth target field value in the business transaction digest information, to obtain a third comparison result; generating a verified historical state root hash based on the historical write set and a Merkle path associated with the historical write set in the Merkle path set; generating a verified updated state root hash based on the write set and the Merkle path associated with the write set in the Merkle path set; and re-executing the business transaction based on the read set to obtain a verification write set, and verifying the validity of the business transaction digest information based on the first comparison result, the second comparison result, the third comparison result, the verified historical state root hash, the verified updated state root hash, and the verification write set.

In one embodiment, the validity of the business transaction digest information is verified based on the first comparison result, the second comparison result, the third comparison result, the verified historical state root hash, the verified updated state root hash, and the verification write set, thereby improving the accuracy of validity verification. In some embodiment, the specific processes of verifying the validity of the business transaction digest information based on the first comparison result, the second comparison result, the third comparison result, the verified historical state root hash, the verified updated state root hash, and the verification write set may include: obtaining a first verification target field value from the verified historical state root hash, and comparing the first verification target field value with a first target field value in the business transaction digest information, to obtain a fourth comparison result; obtaining a second verification target field value from the verified updated state root hash, and comparing the second verification target field value with a second target field value in the business transaction digest information, to obtain a fifth comparison result; comparing the verification write set with the write set to obtain a sixth comparison result; determining that the business transaction digest information is invalid information when any two of the first comparison result, the second comparison result, the third comparison result, the fourth comparison result, the fifth comparison result, and the sixth comparison result are different from each other; and determining that the business transaction digest information is valid information when the first comparison result, the second comparison result, the third comparison result, the fourth comparison result, the fifth comparison result, and the sixth comparison result are all the same comparison result.

Referring to FIG. 10 again, in S7: the verification device generates a verification target field value. It is known that the business transaction digest information includes the transaction sequence number, the business type identifier, the third target field value, the fourth target field value, the fifth target field value, the first target field value, and the second target field value. Therefore, the verification device generates the third verification target field value based on the write set in the transaction execution result, generates the fourth verification target field value based on the historical write set in the transaction execution result, and generates the fifth verification target field value based on the read set in the transaction execution result. The verification device generates the first verification target field value based on the historical write set and the Merkle path corresponding to the historical write set, and generates the second verification target field value based on the write set and the Merkle path corresponding to the write set.

In S8: the verification device compares the verification target field value and a target field value, to obtain a comparison result. Specifically, the verification device compares the first target field value with the first verification target field value. If the first target field value and the first verification target field value are the same, it is determined that the first target field value in the business transaction digest information is valid, and if the first target field value and the first verification target field value are different, it is determined that the first target field value is invalid. The verification device compares the second target field value with the second verification target field value. If the second target field value and the second verification target field value are the same, it is determined that the second target field value in the business transaction digest information is valid, and if the second target field value and the second verification target field value are different, it is determined that the second target field value is invalid. The verification device compares the third target field value with the third verification target field value. If the third target field value and the third verification target field value are the same, it is determined that the third target field value in the business transaction digest information is valid, and if the third target field value and the third verification target field value are different, it is determined that the third target field value is invalid. The same is true for the comparison of the remaining two target field values.

In addition, the verification device re-executes the business transaction based on the read set in the transaction execution result, to obtain the verification write set, and compares the verification write set with the write set, to obtain the sixth comparison result. The verification device determines the validity of the business transaction digest information based on the first comparison result, the second comparison result, the third comparison result, the fourth comparison result, the fifth comparison result, and the sixth comparison result.

In one embodiment, it is determined that the business transaction digest information is invalid information when any two of the first comparison result, the second comparison result, the third comparison result, the fourth comparison result, the fifth comparison result, and the sixth comparison result are different from each other, and it is determined that the business transaction digest information is valid information or whether the business transaction digest information is valid when the first comparison result, the second comparison result, the third comparison result, the fourth comparison result, the fifth comparison result, and the sixth comparison result are all the same comparison result.

In some embodiments, a challenge side chain transaction is generated based on the business type identifier, the transaction sequence number, the transaction execution result, and the Merkle path set when it is verified that the business transaction digest information is invalid information, and the challenge side chain transaction is transmitted to the main blockchain, so that the main blockchain reaches consensus on the challenge side chain transaction, and it is confirmed that the side blockchain Z is an untrusted chain when the consensus is reached on the challenge side chain transaction.

In S9: generate a challenge side chain transaction if any two of the comparison results are different from each other. It is to be understood that if one of the foregoing 6 comparison results is a result different from others, the verification device may generate the challenge side chain transaction based on the business type identifier, the transaction sequence number, the transaction execution result, and the Merkle path set. In S10: the verification device transmits the challenge side chain transaction to the main chain node. In S11: the main chain node verifies the challenge side chain transaction. If the challenge side chain transaction is successfully executed on the main blockchain, it is proved that the side blockchain is an untrusted chain. In this case, the main blockchain may suspend data interaction of the untrusted chain.

In one embodiment, it is determined through the challenge side chain transaction whether the side blockchain is trusted, so as to discover an untrusted side blockchain in time, thereby improving security of the blockchain system.

Figure 11:
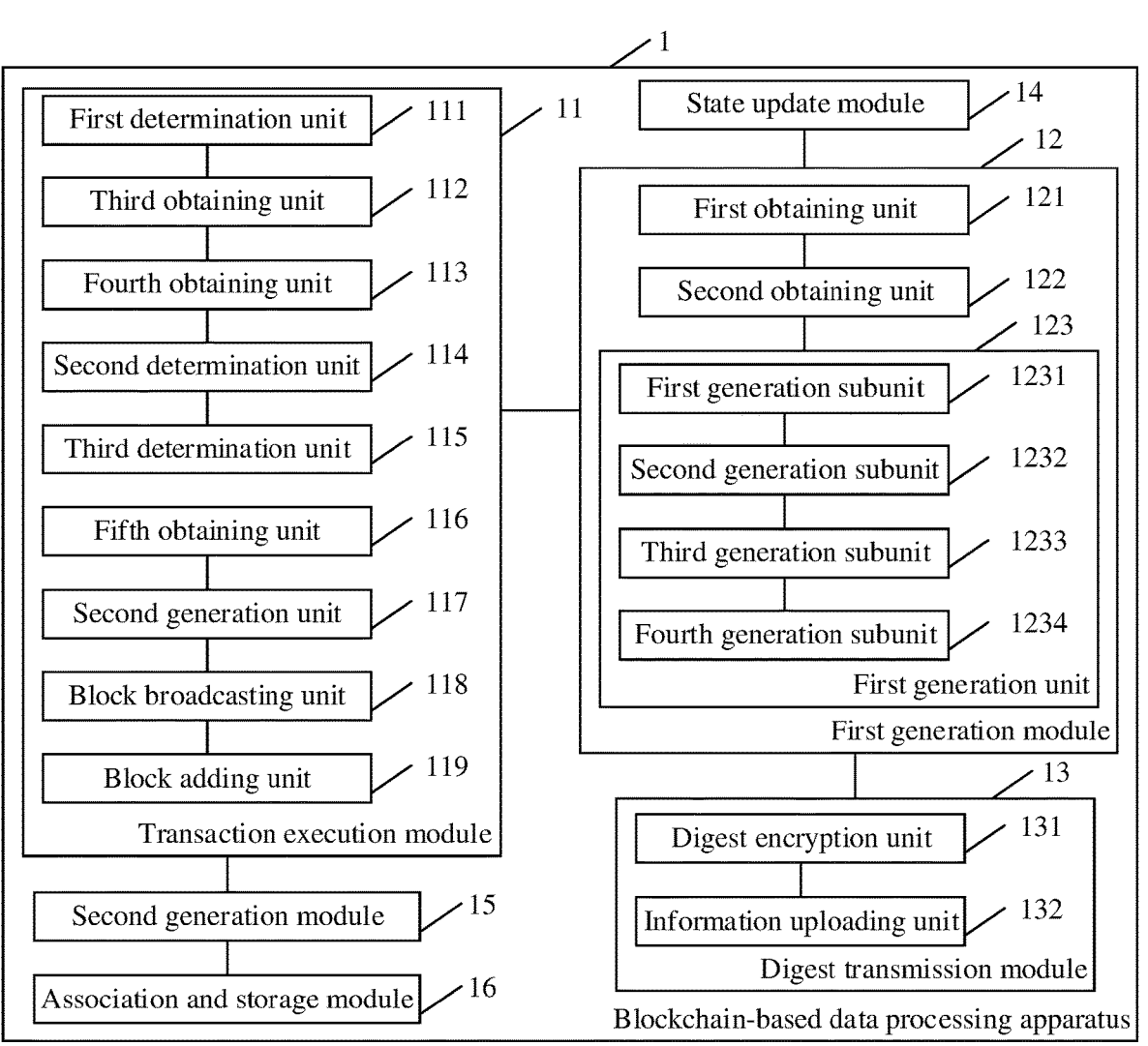
FIG. 11 is a schematic structural diagram of a blockchain-based data processing apparatus according to an embodiment of the present disclosure.

FIG. 11 is a schematic structural diagram of a blockchain-based data processing apparatus according to an embodiment of the present disclosure. The blockchain-based data processing apparatus may be run on a side chain node, the side chain node belongs to a side blockchain in the consortium blockchain, and the consortium blockchain further includes a main blockchain. The blockchain-based data processing apparatus 1 may be configured to perform the corresponding steps in the method provided in one embodiment of the present disclosure. As shown in FIG. 11, the blockchain-based data processing apparatus 1 may include a transaction execution module 11, a first generation module 12, and a digest transmission module 13.

The transaction execution module 11 is configured to obtain a transaction on-chain request transmitted by a business device that carries a business transaction, determine a transaction execution result corresponding to the business transaction based on the transaction on-chain request, and perform on-chain processing on the transaction execution result and the business transaction.

The first generation module 12 is configured to generate business transaction digest information corresponding to the business transaction based on a transaction sequence number, a business type identifier, and the transaction execution result when the transaction execution result and the business transaction are successfully stored in a side blockchain, the transaction sequence number being used for representing a sequence number of the business transaction in the side blockchain, and the business type identifier being used for representing a business type of a business processed by the side blockchain.

The digest transmission module 13 is configured to transmit the business transaction digest information to the main blockchain, so that the main blockchain stores the business transaction digest information.

The blockchain-based data processing apparatus 1 may further include a state update module 14.

The state update module 14 is configured to update a historical state tree based on the transaction execution result, to obtain an updated state tree, the historical state tree being a Merkle tree generated based on a full amount of historical state values in the side blockchain.

The first generation module 12 is specifically configured to generate the business transaction digest information corresponding to the business transaction based on the transaction sequence number, the business type identifier, the transaction execution result, the historical state tree, and the updated state tree.

The first generation module 12 may include a first obtaining unit 121, a second obtaining unit 122, and a first generation unit 123.

The first obtaining unit 121 is configured to obtain a historical state root hash of the historical state tree, and obtain a first target field value from the historical state root hash.

The second obtaining unit 122 is configured to obtain an updated state root hash of the updated state tree, and obtain a second target field value from the updated state root hash.

The first generation unit 123 is configured to generate the business transaction digest information corresponding to the business transaction based on the transaction sequence number, the business type identifier, the transaction execution result, the first target field value, and the second target field value.

The state update module 14 is specifically configured to update the historical state tree based on a write set in the transaction execution result, to obtain the updated state tree, the full amount of historical state values, including a historical write set in the transaction execution result, the write set including updated state values of a first business object in the business transaction, and the historical write set including historical state values of the first business object.

The first generation unit 123 may include a first generation subunit 1231, a second generation subunit 1232, a third generation subunit 1233, and a fourth generation subunit 1234.

The first generation subunit 1231 is configured to generate a first hash value of the write set, and obtain a third target field value from the first hash value.

The second generation subunit 1232 is configured to generate a second hash value of the historical write set, and obtain a fourth target field value from the second hash value.

The third generation subunit 1233 is configured to generate a third hash value of a read set in the transaction execution result, and obtain a fifth target field value from the third hash value, the read set including historical state values of a second business object in the business transaction.

The fourth generation subunit 1234 is configured to combine the transaction sequence number, the business type identifier, the third target field value, the fourth target field value, the fifth target field value, the first target field value, and the second target field value into the business transaction digest information corresponding to the business transaction.

The transaction execution result includes a write set corresponding to the business transaction and a historical write set corresponding to the business transaction, the write set including updated state values, and the historical write set including historical state values.

The blockchain-based data processing apparatus 1 may further include a second generation module 15 and an association and storage module 16.

The second generation module 15 is configured to generate a Merkle path for the updated state values based on the updated state tree, and generate a Merkle path for the historical state values based on the historical state tree.

The association and storage module 16 is configured to store the Merkle path corresponding to each updated state value in the write set in association with the write set.

The association and storage module 16 is further configured to store the Merkle path corresponding to each historical state value in the historical write set in association with the historical write set.

The transaction execution module 11 may include a first determination unit 111, a third obtaining unit 112, a fourth obtaining unit 113, a second determination unit 114, and a third determination unit 115.

The first determination unit 111 is configured to determine a business type of the business transaction, and call a transaction execution function in a smart contract that matches the business type of the business transaction based on the transaction on-chain request when the business type of the business transaction matches the business type identifier.

The third obtaining unit 112 is configured to obtain historical state values of a second business object in the business transaction based on the transaction execution function, and combine the historical state values of the second business object into a read set of the business transaction.

The fourth obtaining unit 113 is configured to execute the transaction execution function based on the business transaction and the read set, and obtain the updated state values of a first business object in the business transaction generated during execution of the transaction execution function.

The second determination unit 114 is configured to determine the updated state values of the first business object as the write set of the business transaction, obtain state values of the first business object before the execution of the transaction execution function, and determine the obtained state values as the historical write set of the business transaction.

The third determination unit 115 is configured to determine the transaction execution result corresponding to the business transaction based on the write set, the historical write set, and the read set.

The transaction execution module 11 may include a fifth obtaining unit 116, a second generation unit 117, a block broadcasting unit 118, and a block adding unit 119.

The fifth obtaining unit 116 is configured to obtain a block having a maximum generation timestamp from the side blockchain when the side chain node has a consensus permission, use the block as a parent block, and use a block header hash value of the parent block as a parent block hash value.

The second generation unit 117 is configured to generate a side chain block based on the parent block hash value, the business transaction carrying the transaction sequence number, the transaction execution result, and the updated state tree generated based on the transaction execution result, a generation timestamp of the side chain block being used for updating a maximum generation timestamp of the side blockchain.

The block broadcasting unit 118 is configured to sign the side chain block by using a node private key corresponding to the side chain node, to obtain signature information, and broadcast the side chain block carrying the signature information to a consensus node in the side blockchain.

The block adding unit 119 is configured to add the side chain block to the side blockchain and return the transaction sequence number to the business device when it is determined that the consensus nodes in the side blockchain reach a consensus on the side chain block.

The digest transmission module 13 may include a digest encryption unit 131 and an information uploading unit 132.

The digest encryption unit 131 is configured to encrypt the business transaction digest information by using a main chain public key of the main blockchain, to obtain encrypted digest information.

The information uploading unit 132 is configured to: call an information uploading function corresponding to the business type identifier in the main blockchain, upload the encrypted digest information to the main blockchain through the information uploading function, so that a main chain node in the main blockchain decrypts the encrypted digest information by using the main chain private key of the main blockchain, and store the business transaction digest information corresponding to a decryption success result when a decryption result is the decryption success result.

In some embodiments, the business transaction digest information stored in the main blockchain is used for being transmitted to a verification device by the main blockchain, the verification device being configured to verify validity of the business transaction digest information based on the transaction execution result obtained from the side blockchain.

US 12,592,840 B2

27

Figure 12:
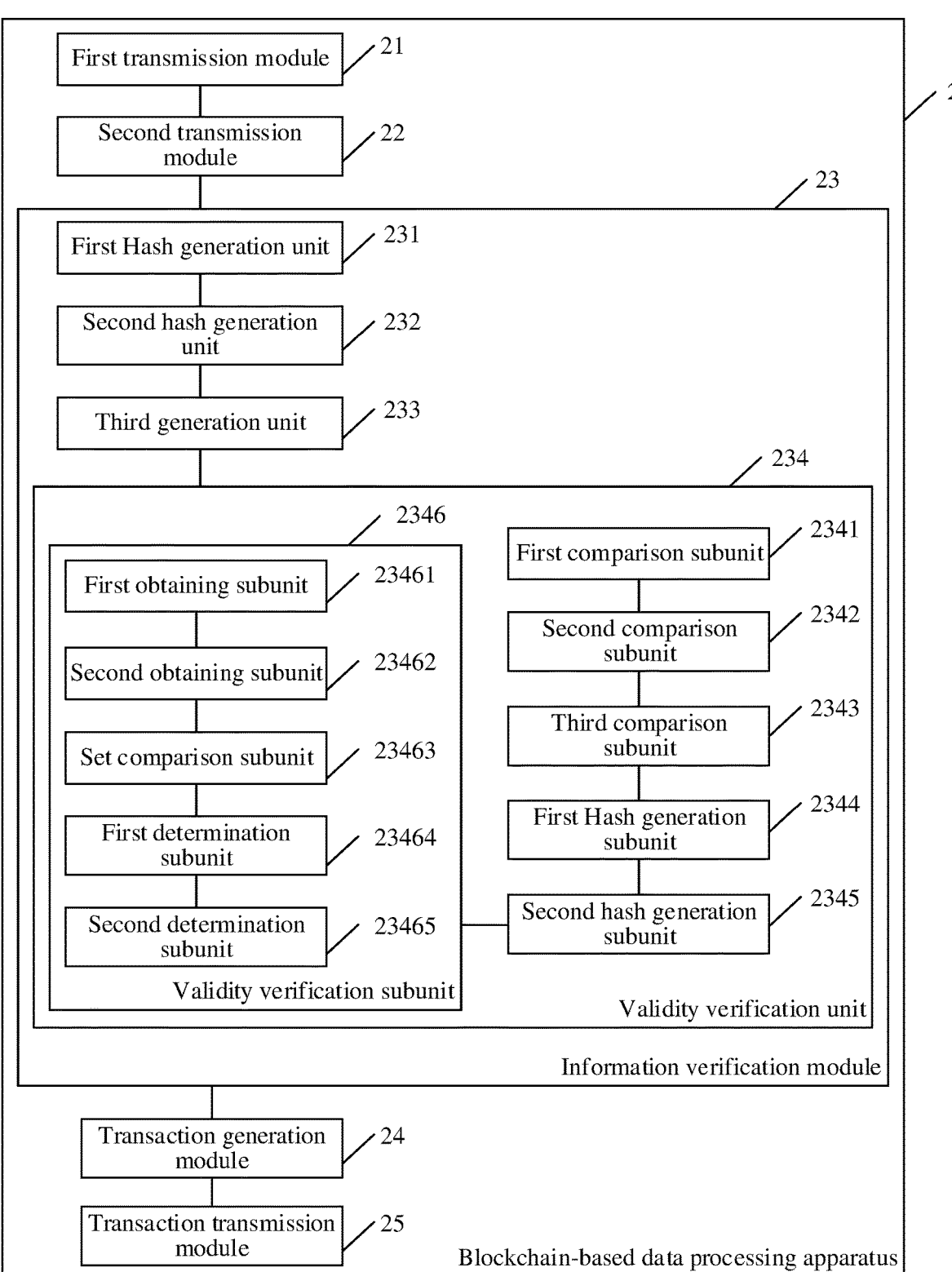
FIG. 12 is a schematic structural diagram of another blockchain-based data processing apparatus according to an embodiment of the present disclosure.

Further, FIG. 12 is a schematic structural diagram of another blockchain-based data processing apparatus according to an embodiment of the present disclosure. The blockchain-based data processing apparatus 2 may be run on a verification device, and the apparatus may be configured to perform the corresponding steps in the method provided in one embodiment of the present disclosure. As shown in FIG. 12, the blockchain-based data processing apparatus 2 may include a first transmission module 21, a second transmission module 22, and an information verification module 23.

The first transmission module 21 is configured to transmit a first data obtaining request carrying a business type identifier and a transaction sequence number to a main blockchain in a consortium blockchain, so that the main blockchain returns business transaction digest information to the verification device, the transaction sequence number being used for representing a sequence number of a business transaction in a side blockchain, the side blockchain belonging to the consortium blockchain, the business transaction digest information being transmitted from the side blockchain to the main blockchain, the business transaction digest information being generated by a first side chain node in the side blockchain when a transaction execution result and the business transaction are successfully stored in the side blockchain, and the business transaction digest information being generated based on the transaction sequence number, the business type identifier, and the transaction execution result, the transaction execution result being determined by the first side chain node based on a transaction on-chain request when the transaction on-chain request transmitted by a business device is obtained, the transaction on-chain request carrying the business transaction, and the business type identifier being used for representing a business type of a business processed by the side blockchain.

The second transmission module 22 is configured to transmit a second data obtaining request carrying the transaction sequence number to the side blockchain, so that a second side chain node in the side blockchain returns the transaction execution result associated with the transaction sequence number to the verification device.

The information verification module 23 is configured to verify validity of the business transaction digest information based on the transaction execution result.

In some embodiments, the business transaction digest information is returned when the main blockchain determines that the verification device has a first obtaining permission for the business transaction digest information.

In some embodiments, the transaction execution result is returned when the second side chain node determines that the verification device has a second obtaining permission.

The second transmission module 22 is further configured to obtain a Merkle path set associated with the transaction sequence number returned by the second side chain node, the Merkle path set being returned when the second side chain node determines that the verification device has the second obtaining permission.

The information verification module 23 is specifically configured to verify the validity of the business transaction digest information based on the transaction execution result and the Merkle path set.

The information verification module 23 may include a first hash generation unit 231, a second hash generation unit 232, a third generation unit 233, and a validity verification unit 234.

The first hash generation unit 231 is configured to generate a first hash value of a write set in the transaction execution result, and obtain a third verification target field value from the first hash value, the write set including updated state values of a first business object in the business transaction.

The second hash generation unit 232 is configured to generate a second hash value of a historical write set in the transaction execution result, and obtain a fourth verification target field value from the second hash value, the historical write set including historical state values of the first business object.

The third generation unit 233 is configured to generate a third hash value of a read set in the transaction execution result, and obtain a fifth verification target field value from the third hash value, the read set including historical state values of a second business object in the business transaction.

The validity verification unit 234 is configured to verify the validity of the business transaction digest information based on the third verification target field value, the fourth verification target field value, the fifth verification target field value, the write set, the historical write set, the read set, and the Merkle path set.

The validity verification unit 234 may include a first comparison subunit 2341, a second comparison subunit 2342, a third comparison subunit 2343, a first hash generation subunit 2344, a second hash generation subunit 2345, and a validity verification subunit 2346.

The first comparison subunit 2341 is configured to compare the third verification target field value with a third target field value in the business transaction digest information, to obtain a first comparison result.

The second comparison subunit 2342 is configured to compare the fourth verification target field value with a fourth target field value in the business transaction digest information, to obtain a second comparison result.

The third comparison subunit 2343 is configured to compare the fifth verification target field value with a fifth target field value in the business transaction digest information, to obtain a third comparison result.

The first hash generation subunit 2344 is configured to generate a verified historical state root hash based on the historical write set and a Merkle path associated with the historical write set in the Merkle path set.

The second hash generation subunit 2345 is configured to generate a verified updated state root hash based on the write set and the Merkle path associated with the write set in the Merkle path set.

The validity verification subunit 2346 is configured to re-execute the business transaction based on the read set to obtain a verification write set, and verify the validity of the business transaction digest information based on the first comparison result, the second comparison result, the third comparison result, the verified historical state root hash, the verified updated state root hash, and the verification write set.

The validity verification subunit 2346 may include a first obtaining subunit 23461, a second obtaining subunit 23462, a set comparison subunit 23463, a first determination subunit 23464, and a second determination subunit 23465.

The first obtaining subunit 23461 is configured to obtain a first verification target field value from the verified historical state root hash, and compare the first verification target field value with a first target field value in the business transaction digest information, to obtain a fourth comparison result.

The second obtaining subunit 23462 is configured to obtain a second verification target field value from the verified updated state root hash, and compare the second verification target field value with a second target field value in the business transaction digest information, to obtain a fifth comparison result.

The set comparison subunit 23463 is configured to compare the verification write set with the write set to obtain a sixth comparison result.

The first determination subunit 23464 is configured to determine that the business transaction digest information is invalid information when any two of the first comparison result, the second comparison result, the third comparison result, the fourth comparison result, the fifth comparison result, and the sixth comparison result are different from each other.

The second determination subunit 23465 is configured to determine that the business transaction digest information is valid information when the first comparison result, the second comparison result, the third comparison result, the fourth comparison result, the fifth comparison result, and the sixth comparison result are all the same comparison result.

The blockchain-based data processing apparatus 2 may further include a transaction generation module 24 and a transaction transmission module 25.

The transaction generation module 24 is configured to generate a challenge side chain transaction based on the business type identifier, the transaction sequence number, the transaction execution result, and the Merkle path set when it is verified that the business transaction digest information is invalid information.

The transaction transmission module 25 is configured to transmit the challenge side chain transaction to the main blockchain, so that the main blockchain reaches consensus on the challenge side chain transaction, and confirm that a side blockchain Z is an untrusted chain when the consensus is reached on the challenge side chain transaction.

Figure 13:
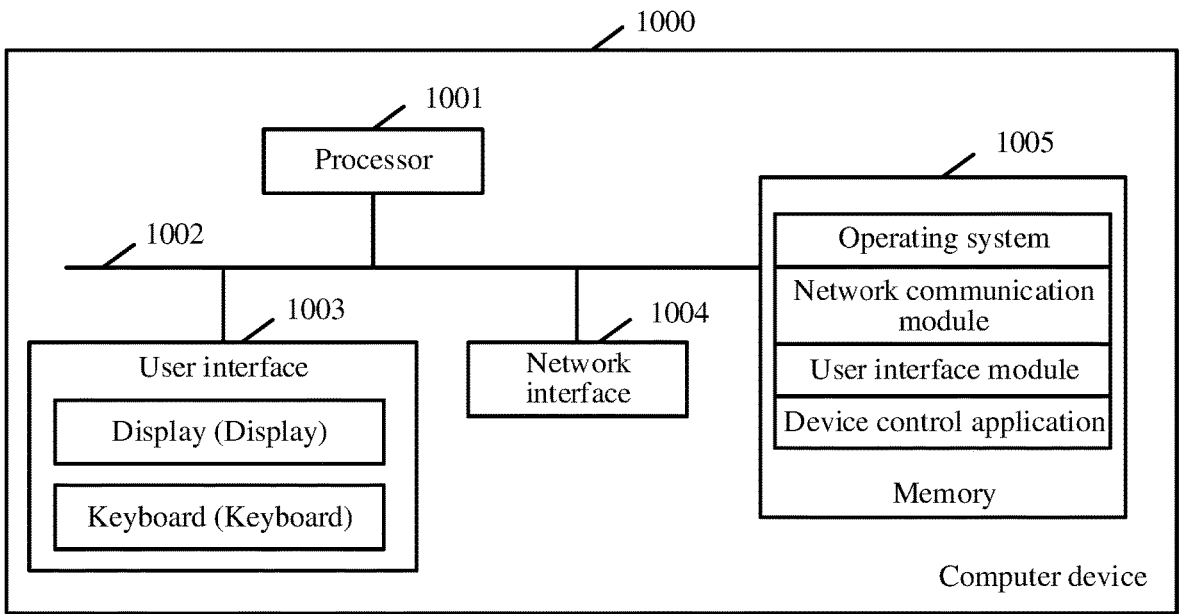
FIG. 13 is a schematic structural diagram of a computer device according to an embodiment of the present disclosure.

FIG. 13 is a schematic structural diagram of a computer device according to an embodiment of the present disclosure. As shown in FIG. 13, the computer device 1000 may include at least one processor 1001, for example, a CPU, at least one network interface 1004, a user interface 1003, a memory 1005, and at least one communication bus 1002. The communication bus 1002 is configured to implement connection and communication between these components. In some embodiments, the user interface 1003 may include a display and a keyboard. The network interface 1004 may include, for example, a standard wired interface and a wireless interface (such as a Wi-Fi interface). The memory 1005 may be a high-speed RAM memory, or may be a non-volatile memory, for example, at least one magnetic disk memory. The memory 1005 may be at least one storage apparatus away from the foregoing processor 1001. As shown in FIG. 13, the memory 1005 as a computer storage medium may include an operating system, a network communication module, a user interface module, and a device control application.

In the computer device 1000 shown in FIG. 13, the network interface 1004 may provide a network communication function. The user interface 1003 is mainly configured to provide an input interface for a user. The processor 1001 may be configured to call a device control application stored in the memory 1005 to:

obtain a transaction on-chain request transmitted by a business device that carries a business transaction, determine a transaction execution result corresponding to the business transaction based on the transaction on-chain request, and perform on-chain processing on the transaction execution result and the business transaction;

generate business transaction digest information corresponding to the business transaction based on a transaction sequence number, a business type identifier, and the transaction execution result when the transaction execution result and the business transaction are successfully stored in a side blockchain Z, the transaction sequence number being used for representing a sequence number of the business transaction in the side blockchain Z, and the business type identifier being used for representing a business type of a business processed by the side blockchain Z; and transmit the business transaction digest information to a main blockchain, so that the main blockchain stores the business transaction digest information, the business transaction digest information stored in the main blockchain being used for being transmitted to a verification device by the main blockchain, and the verification device being configured to verify validity of the business transaction digest information based on the transaction execution result obtained from the side blockchain Z.

It is to be understood that the computer device 1000 described in one embodiment of the present disclosure may perform the description of the blockchain-based data processing method or apparatus in the foregoing embodiments. In addition, for the description of the beneficial effects of using the same method, details are not repeated herein.

This embodiment of the present disclosure further provides a computer-readable storage medium, storing computer-readable instructions, the computer-readable instructions, when executed by a processor, causing the processor to perform the description of the blockchain-based data processing method or apparatus in the foregoing embodiments. In addition, for the description of the beneficial effects of using the same method, details are not repeated herein.

The foregoing computer-readable storage medium may be the blockchain-based data processing apparatus provided in any one of the foregoing embodiments or an internal storage unit of the foregoing computer device, for example, a hard disk or an internal memory of the computer device. The computer-readable storage medium may also be an external storage device, for example, a plug-in hard disk, a smart media card (SMC), a secure digital (SD) card, a flash card, and the like equipped on the computer device. Further, the computer-readable storage medium may further include both the internal storage unit and the external storage device of the computer device. The computer-readable storage medium is configured to store the computer-readable instructions and other programs and data required by the computer device. The computer-readable storage medium may further be configured to temporarily store data that has been outputted or that is to be outputted.

This embodiment of the present disclosure further provides a computer program product, the computer program product including computer-readable instructions, the computer-readable instructions being stored in a computer-readable storage medium. A processor of a computer device reads the computer-readable instructions from the computer-readable storage medium. The processor executes the computer-readable instructions, causing the computer device to perform the description of the blockchain-based data processing method or apparatus in the foregoing embodiments. In addition, for the description of the beneficial effects of using the same method, details are not repeated herein.

The term module (and other similar terms such as submodule, unit, subunit, etc.) in the present disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The terms "first", "second" and the like in the specification and claims of the embodiments of the present disclosure and the accompanying drawings are used for distinguishing different objects, rather than being used for describing a specific order. Moreover, the term "including" and any variation thereof are intended to cover non-exclusive inclusions. For example, processes, methods, apparatuses, products, or devices including a series of steps or units are not limited to the listed steps or modules, but instead, optionally include steps or modules not listed, or optionally include other steps or units inherent in these processes, methods, apparatuses, products, or devices.

A person of ordinary skill in the art may realize that steps of units and algorithms of various examples described with reference to the embodiments disclosed in this specification can be implemented in electronic hardware, computer software or a combination of the electronic hardware and the computer software. In order to clearly describe the interchangeability of hardware and software, the compositions and steps of the various examples have been generally described in terms of functionality in the foregoing description. Whether the functions are performed by hardware or software depends on particular applications and design constraint conditions of the technical solutions. A person skilled in the art may use different methods to implement the described functions for each particular application, but it is not considered that the implementation goes beyond the scope of the present disclosure.

Disclosed herein is merely exemplary embodiments of the present disclosure, and certainly is not intended to limit the scope of the claims of the present disclosure. Therefore, equivalent variations made in accordance with the claims of the present disclosure fall within the scope of the present disclosure.

What is claimed is:

1. A blockchain-based data processing method, performed by a side chain node, the side chain node belonging to a side blockchain in a consortium blockchain and the consortium blockchain further comprising a main blockchain, the method comprising:

obtaining a transaction on-chain request carrying a business transaction transmitted by a business device, determining a transaction execution result corresponding to the business transaction based on the transaction on-chain request, and performing on-chain processing on the transaction execution result and the business transaction;

generating business transaction digest information corresponding to the business transaction based on a transaction sequence number, a business type identifier, and the transaction execution result in response to the transaction execution result and the business transaction being successfully stored in the side blockchain, the transaction sequence number being used for representing a sequence number of the business transaction in the side blockchain, and the business type identifier being used for representing a business type of a business processed by the side blockchain; and transmitting the business transaction digest information to the main blockchain to store the business transaction digest information.

2. The method according to claim 1, further comprising:

updating a historical state tree based on the transaction execution result, to obtain an updated state tree, the historical state tree being a Merkle tree generated based on a full amount of historical state values in the side blockchain; wherein generating the business transaction digest information corresponding to the business transaction based on a transaction sequence number, a business type identifier, and the transaction execution result comprises:

generating the business transaction digest information corresponding to the business transaction based on the transaction sequence number, the business type identifier, the transaction execution result, the historical state tree, and the updated state tree.

3. The method according to claim 2, wherein generating the business transaction digest information corresponding to the business transaction based on the transaction sequence number, the business type identifier, the transaction execution result, the historical state tree, and the updated state tree comprises:

obtaining a historical state root hash of the historical state tree, and obtaining a first target field value from the historical state root hash;

obtaining an updated state root hash of the updated state tree, and obtaining a second target field value from the updated state root hash; and generating the business transaction digest information corresponding to the business transaction based on the transaction sequence number, the business type identifier, the transaction execution result, the first target field value, and the second target field value.

4. The method according to claim 3, wherein updating the historical state tree based on the transaction execution result, to obtain the updated state tree comprises:

updating the historical state tree based on a write set in the transaction execution result, to obtain the updated state tree, the full amount of the historical state values comprising a historical write set in the transaction execution result, the write set comprising updated state values of a first business object in the business transaction, and the historical write set comprising historical state values of the first business object, wherein generating the business transaction digest information corresponding to the business transaction based on the transaction sequence number, the business type identifier, the transaction execution result, the first target field value, and the second target field value comprises:

generating a first hash value of the write set, and obtaining a third target field value from the first hash value;

generating a second hash value of the historical write set, and obtaining a fourth target field value from the second hash value;

generating a third hash value of a read set in the transaction execution result, and obtaining a fifth target field value from the third hash value, the read set comprising historical state values of a second business object in the business transaction; and combining the transaction sequence number, the business type identifier, the third target field value, the fourth target field value, the fifth target field value, the first target field value, and the second target field value into the business transaction digest information corresponding to the business transaction.

5. The method according to claim 4, wherein determining the transaction execution result corresponding to the business transaction based on the transaction on-chain request comprises:

determining a business type of the business transaction, and calling a transaction execution function in a smart contract that matches the business type of the business transaction based on the transaction on-chain request in response to the business type of the business transaction matching the business type identifier;

obtaining the historical state values of the second business object in the business transaction based on the transaction execution function, and combining the historical state values of the second business object into a read set of the business transaction;

executing the transaction execution function based on the business transaction and the read set, and obtaining the updated state values of the first business object in the business transaction generated during execution of the transaction execution function;

determining the updated state values of the first business object as the write set of the business transaction, obtaining state values of the first business object before the execution of the transaction execution function, and determining the obtained state values as the historical write set of the business transaction; and determining the transaction execution result corresponding to the business transaction based on the write set, the historical write set, and the read set.

6. The method according to claim 2, wherein the transaction execution result comprises a write set corresponding to the business transaction and a historical write set corresponding to the business transaction, the write set comprising updated state values, and the historical write set comprising historical state values; and the method further comprising:

generating a Merkle path for the updated state values based on the updated state tree, and generating a Merkle path for the historical state values based on the historical state tree;

storing the Merkle path corresponding to an updated state value of the updated state values in the write set in association with the write set; and storing the Merkle path corresponding to a historical state value of the historical state value in the historical write set in association with the historical write set.

7. The method according to claim 1, wherein performing the on-chain processing on the transaction execution result and the business transaction comprises:

obtaining a block having a maximum generation timestamp from the side blockchain in response to the side chain node having a consensus permission, using the block as a parent block, and using a block header hash value of the parent block as a parent block hash value;

generating a side chain block based on the parent block hash value, the business transaction carrying the transaction sequence number, the transaction execution result, and the updated state tree generated based on the transaction execution result, a generation timestamp of the side chain block being used for updating a maximum generation timestamp of the side blockchain;

signing the side chain block by using a node private key corresponding to the side chain node, to obtain signature information, and broadcasting the side chain block carrying the signature information to a consensus node in the side blockchain; and adding the side chain block to the side blockchain, and returning the transaction sequence number to the business device when it is determined that the consensus nodes in the side blockchain reach a consensus on the side chain block.

8. The method according to claim 1, wherein transmitting the business transaction digest information to the main blockchain comprises:

encrypting the business transaction digest information by using a main chain public key of the main blockchain, to obtain encrypted digest information; and calling an information uploading function corresponding to the business type identifier in the main blockchain, uploading the encrypted digest information to the main blockchain through the information uploading function, wherein a main chain node in the main blockchain decrypts the encrypted digest information by using the main chain private key of the main blockchain, and storing the business transaction digest information corresponding to a decryption success result when a decryption result is the decryption success result.

9. The method according to claim 1, wherein the business transaction digest information stored in the main blockchain is transmitted to a verification device by the main blockchain, the verification device being configured to verify validity of the business transaction digest information based on the transaction execution result obtained from the side blockchain.

10. A computer device, comprising a memory and one or more processors, the memory storing computer-readable instructions that, when being executed, cause the one or more processors to perform:

obtaining a transaction on-chain request carrying a business transaction transmitted by a business device, determining a transaction execution result corresponding to the business transaction based on the transaction on-chain request, and performing on-chain processing on the transaction execution result and the business transaction;

generating business transaction digest information corresponding to the business transaction based on a transaction sequence number, a business type identifier, and the transaction execution result in response to the transaction execution result and the business transaction being successfully stored in a side blockchain in a consortium blockchain, the transaction sequence number being used for representing a sequence number of the business transaction in the side blockchain, and the business type identifier being used for representing a business type of a business processed by the side blockchain; and transmitting the business transaction digest information to a main blockchain to store the business transaction digest information.

11. The device according to claim 10, wherein the one or more processors are further configured to perform:

updating a historical state tree based on the transaction execution result, to obtain an updated state tree, the historical state tree being a Merkle tree generated based on a full amount of historical state values in the side blockchain; and generating the business transaction digest information corresponding to the business transaction based on the transaction sequence number, the business type identifier, the transaction execution result, the historical state tree, and the updated state tree.

12. The device according to claim 11, wherein the one or more processors are further configured to perform:

obtaining a historical state root hash of the historical state tree, and obtaining a first target field value from the historical state root hash;

obtaining an updated state root hash of the updated state tree, and obtaining a second target field value from the updated state root hash; and generating the business transaction digest information corresponding to the business transaction based on the transaction sequence number, the business type identifier, the transaction execution result, the first target field value, and the second target field value.

13. The device according to claim 12, wherein the one or more processors are further configured to perform:

updating the historical state tree based on a write set in the transaction execution result, to obtain the updated state tree, the full amount of the historical state values comprising a historical write set in the transaction execution result, the write set comprising updated state values of a first business object in the business transaction, and the historical write set comprising historical state values of the first business object;

generating a first hash value of the write set, and obtaining a third target field value from the first hash value;

generating a second hash value of the historical write set, and obtaining a fourth target field value from the second hash value;

generating a third hash value of a read set in the transaction execution result, and obtaining a fifth target field value from the third hash value, the read set comprising historical state values of a second business object in the business transaction; and combining the transaction sequence number, the business type identifier, the third target field value, the fourth target field value, the fifth target field value, the first target field value, and the second target field value into the business transaction digest information corresponding to the business transaction.

14. The device according to claim 13, wherein the one or more processors are further configured to perform:

determining a business type of the business transaction, and calling a transaction execution function in a smart contract that matches the business type of the business transaction based on the transaction on-chain request in response to the business type of the business transaction matching the business type identifier;

obtaining the historical state values of the second business object in the business transaction based on the transaction execution function, and combining the historical state values of the second business object into a read set of the business transaction;

executing the transaction execution function based on the business transaction and the read set, and obtaining the updated state values of the first business object in the business transaction generated during execution of the transaction execution function;

determining the updated state values of the first business object as the write set of the business transaction, obtaining state values of the first business object before the execution of the transaction execution function, and determining the obtained state values as the historical write set of the business transaction; and determining the transaction execution result corresponding to the business transaction based on the write set, the historical write set, and the read set.

15. The device according to claim 11, wherein the transaction execution result comprises a write set corresponding to the business transaction and a historical write set corresponding to the business transaction, the write set comprising updated state values, and the historical write set comprising historical state values; and the one or more processors are further configured to perform:

generating a Merkle path for the updated state values based on the updated state tree, and generating a Merkle path for the historical state values based on the historical state tree;

storing the Merkle path corresponding to an updated state value of the updated state values in the write set in association with the write set; and storing the Merkle path corresponding to a historical state value of the historical state value in the historical write set in association with the historical write set.

16. The device according to claim 10, wherein the one or more processors are further configured to perform:

obtaining a block having a maximum generation timestamp from the side blockchain in response to a side chain node of the side blockchain having a consensus permission, using the block as a parent block, and using a block header hash value of the parent block as a parent block hash value;

generating a side chain block based on the parent block hash value, the business transaction carrying the transaction sequence number, the transaction execution result, and the updated state tree generated based on the transaction execution result, a generation timestamp of the side chain block being used for updating a maximum generation timestamp of the side blockchain;

signing the side chain block by using a node private key corresponding to the side chain node, to obtain signature information, and broadcasting the side chain block carrying the signature information to a consensus node in the side blockchain; and adding the side chain block to the side blockchain, and returning the transaction sequence number to the business device when it is determined that the consensus nodes in the side blockchain reach a consensus on the side chain block.

17. The device according to claim 10, wherein the one or more processors are further configured to perform:

encrypting the business transaction digest information by using a main chain public key of the main blockchain, to obtain encrypted digest information; and calling an information uploading function corresponding to the business type identifier in the main blockchain, uploading the encrypted digest information to the main blockchain through the information uploading function, wherein a main chain node in the main blockchain decrypts the encrypted digest information by using the main chain private key of the main blockchain, and storing the business transaction digest information corresponding to a decryption success result when a decryption result is the decryption success result.

18. A non-transitory computer readable storage medium containing computer-readable instructions that, when being executed, cause one or more processors to perform:

obtaining a transaction on-chain request carrying a business transaction transmitted by a business device, determining a transaction execution result corresponding to the business transaction based on the transaction on-chain request, and performing on-chain processing on the transaction execution result and the business transaction;

generating business transaction digest information corresponding to the business transaction based on a transaction sequence number, a business type identifier, and the transaction execution result in response to the transaction execution result and the business transaction being successfully stored in a side blockchain in a consortium blockchain, the transaction sequence number being used for representing a sequence number of the business transaction in the side blockchain, and the business type identifier being used for representing a business type of a business processed by the side blockchain; and transmitting the business transaction digest information to a main blockchain to store the business transaction digest information.

19. The storage medium according to claim 18, wherein the one or more processors are further configured to perform:

updating a historical state tree based on the transaction execution result, to obtain an updated state tree, the historical state tree being a Merkle tree generated based on a full amount of historical state values in the side blockchain; and generating the business transaction digest information corresponding to the business transaction based on the transaction sequence number, the business type identifier, the transaction execution result, the historical state tree, and the updated state tree.

20. The storage medium according to claim 19, wherein the one or more processors are further configured to perform:

obtaining a historical state root hash of the historical state tree, and obtaining a first target field value from the historical state root hash;

obtaining an updated state root hash of the updated state tree, and obtaining a second target field value from the updated state root hash; and generating the business transaction digest information corresponding to the business transaction based on the transaction sequence number, the business type identifier, the transaction execution result, the first target field value, and the second target field value.

\* \* \* \* \*